US006530251B1

(12) United States Patent
Dimig

(10) Patent No.: US 6,530,251 B1
(45) Date of Patent: Mar. 11, 2003

(54) MODULAR VEHICLE DOOR LOCK AND LATCH SYSTEM AND METHOD

(75) Inventor: Steven J. Dimig, Plymouth, WI (US)

(73) Assignee: Strattec Security Corporation, Milwaukee, WI (US)

( * ) Notice: Subject to any disclaimer, the term of this patent is extended or adjusted under 35 U.S.C. 154(b) by 0 days.

(21) Appl. No.: 09/442,724

(22) Filed: Nov. 18, 1999

(51) Int. Cl.[7] .............................................. B60R 25/00

(52) U.S. Cl. ............................ 70/237; 70/208; 70/277; 49/503; 292/336.3; 292/DIG. 23

(58) Field of Search ......................... 70/208, 237, 275, 70/263, 264, 277; 49/502, 503; 296/146.1, 146.2, 146.5, 146.6, 146.9; 29/700; 292/DIG. 23, DIG. 27, 336.3, 201, 216

(56) References Cited

U.S. PATENT DOCUMENTS

| | | | | |
|---|---|---|---|---|
| 5,308,128 A | | 5/1994 | Portelli et al. | 292/216 |
| 5,328,219 A | | 7/1994 | Konchan et al. | 292/216 |
| 5,340,174 A | * | 8/1994 | Bender et al. | 292/336.3 |
| 5,497,640 A | * | 3/1996 | Kokuryo | 70/237 |
| 5,505,024 A | * | 4/1996 | DeRees et al. | 49/503 |
| 5,558,372 A | * | 9/1996 | Kapes et al. | 292/336.3 |
| 5,666,834 A | * | 9/1997 | Inoue | 70/237 |
| 5,676,002 A | * | 10/1997 | Hoeptner, III | 292/DIG. 23 X |
| 5,706,554 A | | 1/1998 | Rückert et al. | 16/112 |
| 5,794,994 A | * | 8/1998 | Miyagawa et al. | 292/336.3 |
| 5,852,943 A | * | 12/1998 | Dutka et al. | 70/237 |
| 5,876,074 A | * | 3/1999 | Dowling | 292/201 |
| 5,895,081 A | * | 4/1999 | Tanimoto et al. | 292/348 |
| 5,902,004 A | * | 5/1999 | Waltz et al. | 49/503 X |
| 5,904,002 A | | 5/1999 | Emerling et al. | 49/502 |
| 5,927,772 A | * | 7/1999 | Antonucci et al. | 292/336.3 |
| 5,987,942 A | * | 11/1999 | Ichinose | 70/208 |
| 5,996,381 A | * | 12/1999 | Yoneyama | 70/237 |
| 6,050,117 A | * | 4/2000 | Weyerstall | 70/277 |
| 6,062,615 A | * | 5/2000 | Hunt et al. | 292/336.3 |
| 6,073,397 A | * | 6/2000 | Tanimoto et al. | 292/336.3 X |
| 6,079,757 A | * | 6/2000 | Aubry | 292/201 |
| 6,102,453 A | * | 8/2000 | Cetnar | 292/201 |
| 6,109,674 A | * | 8/2000 | Bartel et al. | 292/337 |
| 6,141,914 A | * | 11/2000 | Feige et al. | 49/503 |
| 6,142,540 A | * | 11/2000 | Girard et al. | 292/216 |
| 6,189,267 B1 | * | 2/2001 | Stase | 49/503 |
| 6,192,725 B1 | * | 2/2001 | Watson et al. | 70/237 X |
| 6,240,754 B1 | * | 6/2001 | Petersen | 292/DIG. 23 X |
| 6,241,294 B1 | * | 6/2001 | Young et al. | 292/336.3 |
| 6,254,148 B1 | * | 7/2001 | Cetnar | 292/201 |
| 6,264,254 B1 | * | 7/2001 | Siegfried et al. | 292/336.3 |
| 6,264,257 B1 | * | 7/2001 | Meinke | 292/336.3 |

FOREIGN PATENT DOCUMENTS

| | | | |
|---|---|---|---|
| CA | 1 332 620 A | | 10/1994 |
| EP | 169644 | * | 6/1985 |
| EP | 0 400 505 A1 | | 12/1990 |
| EP | 0 508 580 A1 | | 10/1992 |
| WO | WO98/49417 A | | 11/1998 |

* cited by examiner

*Primary Examiner*—Suzanne Dino Barrett
(74) *Attorney, Agent, or Firm*—Michael Best & Friedrich LLP

(57) ABSTRACT

An improved modular vehicle door lock and latch system is disclosed which includes a door latch mechanism, an inside door latch and door lock handle, and a unique outside door handle and door lock interface member, all of which are assembled into a pre-connected configuration together with all necessary control cables, thereby significantly reducing the labor required to assemble the lock and latch system into a door of a motor vehicle and correspondingly resulting in a significant cost reduction. A first module includes the inside door handle, the outside and inside locks, the door latch, and an outside door lock and door handle interface member, as well as linkages between these components. A second component is an outside door handle assembly which will be operatively connected to the outside door lock and door handle interface member. The outside door handle of the preferred embodiment has a lock plate which installs the outside door handle in position by merely placing it into position in an opening in the vehicle door and moving the handle from its non-actuated position to its actuated position.

18 Claims, 12 Drawing Sheets

FIG. 4
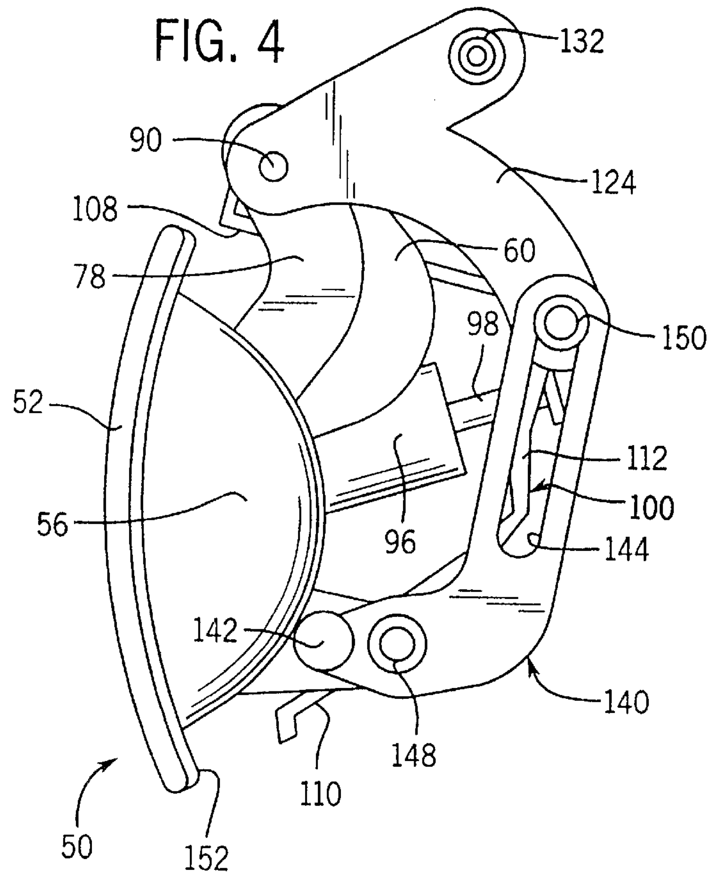
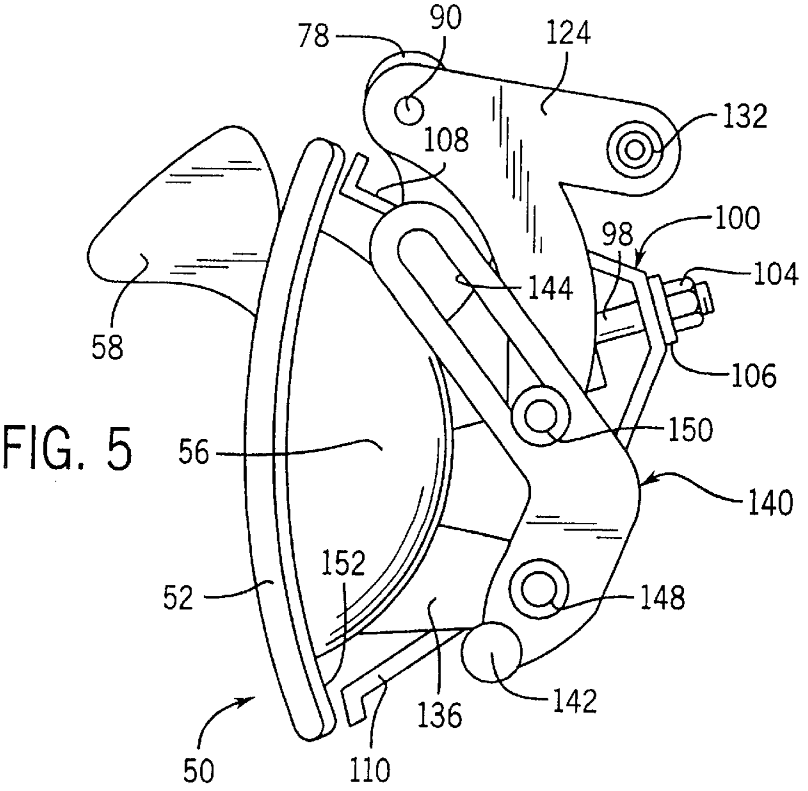
FIG. 5

FIG. 6
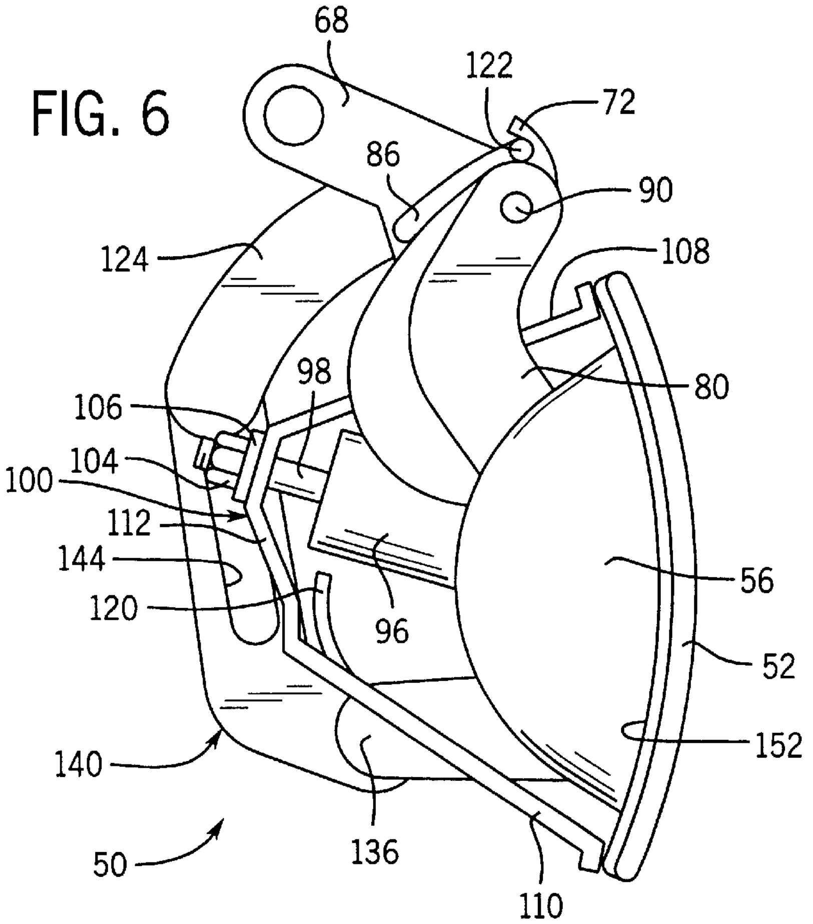
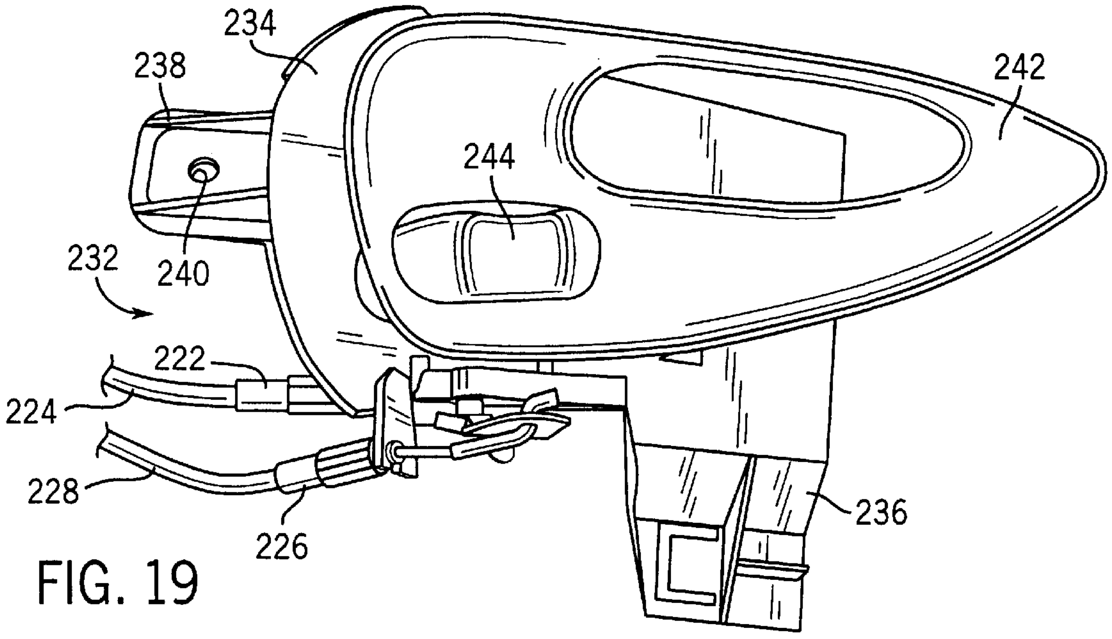
FIG. 19

FIG. 7
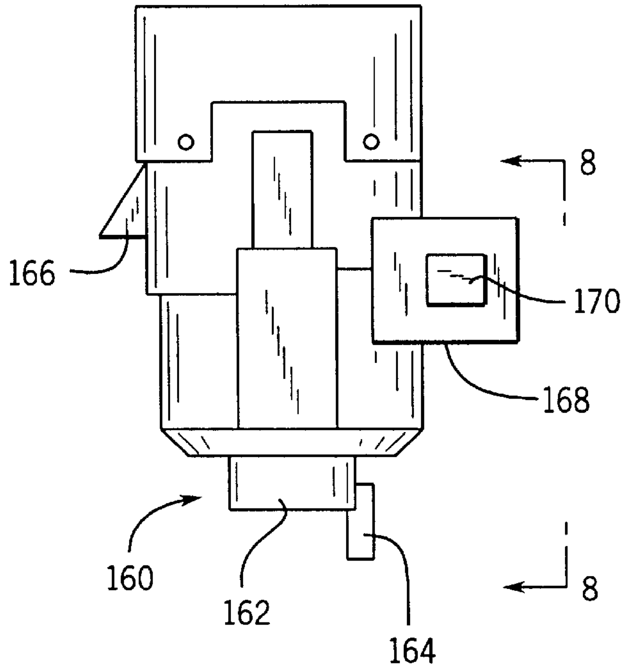
FIG. 8
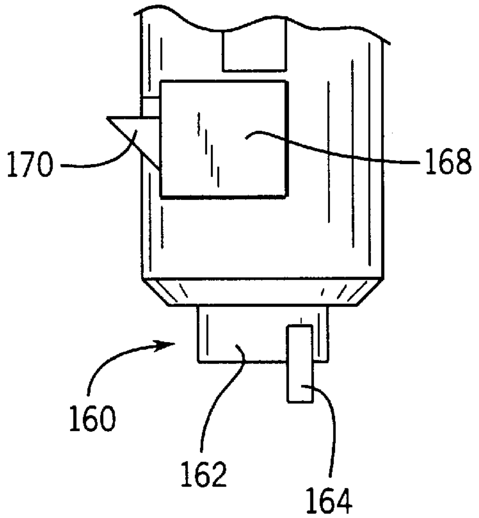
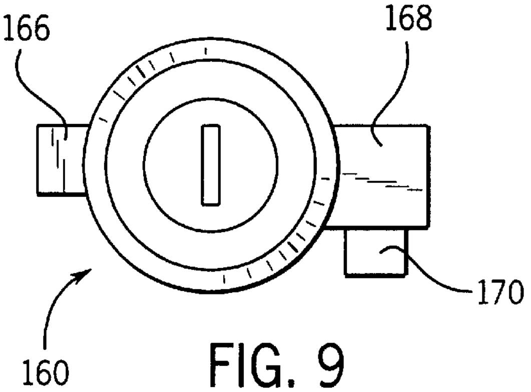
FIG. 9
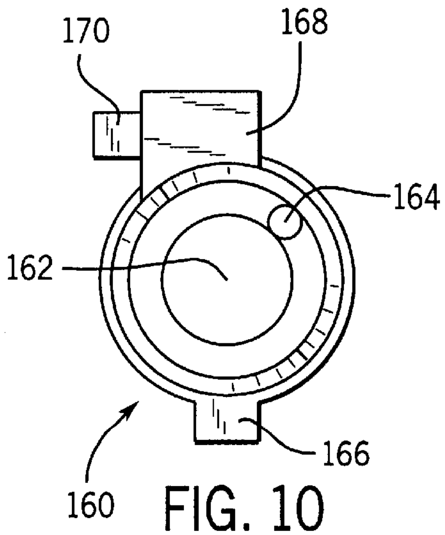
FIG. 10

MODULAR VEHICLE DOOR LOCK AND LATCH SYSTEM AND METHOD

BACKGROUND OF THE INVENTION

FIELD OF THE INVENTION

The present invention relates generally to vehicle door locking and latching apparatus, and more particularly to an improved modular vehicle door lock and latch system which includes the door latch mechanism, the inside door release and door lock handles, and a unique outside door lock and door handle interface member, all of which may be assembled into a pre-connected configuration together with all necessary control cables, thereby significantly reducing the labor required to assemble these components into a door of a motor vehicle and correspondingly resulting in a significant cost reduction.

The mass production of motor vehicles continues to represent a challenge to manufacturers to continue to achieve additional cost savings both at the component level and in the amount of labor required to manufacture the motor vehicles. Manufacturers which fall behind are at a tremendous disadvantage in the marketplace with respect to other manufacturers which excel both at achieving this type of savings and in passing it on to the ultimate consumers of the motor vehicles. This pressure has in turn been exerted by motor vehicle manufacturers upon their suppliers, which must either find ways to reduce the cost of the components they supply or reduce the labor their components require the manufacturers to expend to assemble the components into the motor vehicles, or both, or face the loss of supply contracts to other vendors who can do so.

Motor vehicle manufacturers have continued to address this issue in part by reducing the number of parts which they must integrate during the assembly of the motor vehicles. This has particularly been true in the design and manufacture of more inexpensive motor vehicles such as compact and subcompact cars, but it has been expanded to include the entire lineup of motor vehicles manufactured. One area of motor vehicle manufacture which has remained particularly labor-intensive is the assembly of components into the doors of motor vehicles.

Vehicle doors typically consist of a structural framework including the outer skin of the door, and are typically made of steel segments which are welded together. This structural framework of the vehicle door has a number of components mounted therein or thereto, with such components including the door's locks and latches, the window assembly, audio system speakers, weather-stripping, and trim components, with all of these components being assembled to the structural framework of the vehicle door one by one. This assembly procedure requires an assembly operator to first insert, locate, and fasten each component to the mounting surfaces of the structural framework of the vehicle door, and then to make any necessary connections such as electrical or mechanical linkages.

It will at once be appreciated by those skilled in the art that this assembly process is slow and cumbersome, both because of the large number of components that need to be individually assembled into or onto the structural framework of the vehicle door, and also because the access to the inside of the structural framework of the vehicle door is very limited. It is common for some of the components or their connections to be incorrectly assembled because of the awkward accessibility and poor visibility into the structural framework of the vehicle door. It is also common for injuries to occur because of the need to reach far into the structural framework of the vehicle door through openings that have sharp sheet metal edges. Additionally, assembly methods currently used to assemble components into and onto the structural framework of the vehicle door require a large number of fasteners and specialized tools to mount the components in place.

Virtually without exception, the one of these groups of components which requires the largest amount of labor is the door locking and latching system. The components included in a typical vehicle door for locking and latching that door include a door latch mechanism, an inside door handle, an inside lock actuating lever or knob, an outside door handle, an outside key-operated lock, and a combination of levers, rods, and/or cables interconnecting these components. A large percentage of motor vehicles also include a power locking mechanism, and potentially an additional lever or rod or other type of mechanism interconnecting the power lock motor with the door latch mechanism.

It is accordingly the primary objective of the present invention that it provide a locking and latching system of modular construction such that the components of the system are preassembled to the greatest extent possible prior to their installation into the structural framework of a vehicle door. It is a related objective of the lock and latch system of the present invention that its modular components include the outside and inside door handles, the outside and inside locks, the door latch itself, as well as all necessary linkages between these components. It is an additional objective of the present invention that the modular components further facilitate the assembly process by being designed such that the process of installing them into the structural framework of a vehicle door be as simple as is possible, and that it not require the use of specialized tools, thereby further reducing the labor costs associated with assembly. It is another objective of the present invention that it substantially enhance the security of the vehicle by providing a lock and latch system which has an enhanced level of resistance to manipulation by jimmying with a "slim jim" or similar tool of the type commonly used by car thieves It is a further objective of the lock and latch system of the present invention that it include the outside door handle as a separate modular component, thereby allowing outside door handles to be manufactured in a variety of colors to match exterior vehicle paint colors while allowing the other modular components of the system to be of a single type and color. It is yet a further objective of the present invention that the preassembled nature of the modular components eliminate the requirement for adjustments to be made during the assembly of the components of the lock and latch system into the structural framework of a vehicle door, thereby further minimizing assembly costs while simultaneously enhancing vehicle quality. It is still a further objective of the lock and latch system of the present invention that its modular components be adaptable for use on a variety of different vehicles by merely switching outside door handles and providing different size linkages between the various modular components.

The lock and latch system of the present invention must also be of a construction which is both durable and long lasting, and it should also require little or no maintenance to be provided by the user throughout its operating lifetime. In order to enhance the market appeal of the lock and latch system of the present invention, it should also be of inexpensive construction to thereby afford it the broadest possible market. Finally, it is also an objective that all of the aforesaid advantages and objectives of the lock and latch system of the present invention be achieved without incurring any substantial relative disadvantage.

SUMMARY OF THE INVENTION

The disadvantages and limitations of the background art discussed above are overcome by the present invention. With this invention, a lock and latch system is manufactured in three modular assemblies, the first of which includes the inside door handle, the inside lock, the door latch, and an outside door lock and door handle interface member, as well as linkages between these components. The second component is an outside door lock which is easily installed in the outside door lock and door handle interface member. The third component is an outside door handle assembly which will be operatively connected to the outside door lock and door handle interface member.

In an alternate embodiment, the inside door handle and the inside lock together comprise a fourth component which is not initially connected to the rest of the first component (the door latch, the outside door lock and door handle interface member, and the linkages between components). In this embodiment, the first component does, however, include the linkage members which will be connected to the mechanism of the inside door handle of the inside door lock. Typically, while the rest of the first component is installed in the structural framework of the vehicle door, these linkage members will extend out of the vehicle door to allow them to be connected to the inside door handle in the inside door lock. Thus, in this embodiment, following the connection of the first and fourth components together, the inside door handle in the inside door lock will be installed into the structural framework of the vehicle door.

In the preferred embodiment, the outside door handle is installable in the manner described in U.S. Pat. No. 5,706,554, to Rukert et al., by merely placing the outside door handle assembly into position in an opening in the outer skin of the structural framework of the vehicle door and moving the handle from its non-actuated position to its actuated position. U.S. Pat. No. 5,706,554 is hereby incorporated herein by reference. Alternately, a conventional design door handle of either the paddle type or the pull strap type could be used instead of the type of door handle taught by the ’554 patent. Either of these types of door handles may either be mounted and pivot with respect to an outside door handle housing member which is a part of the second component, the sheet metal of the outer skin of the structural framework of the vehicle door, or the outside door lock and door handle interface member.

The outside door lock and door handle interface member is designed to be installed in or close adjacent to the opening in the outer skin of the structural framework of the vehicle door. In the preferred embodiment, the outside door lock and door handle interface member installs into the opening without using tools, with the outside door handle assembly retaining the outside door lock and door handle interface member in position when the outside door handle assembly is installed into the opening. In this embodiment, the housing of the outside door lock and door handle interface member may be made of a die-cast zinc element which interlocks with the sheet metal of the outer skin of the structural framework of the vehicle door. It will be appreciated by those skilled in the art that such a mounting arrangement will result in an enhanced level of security for the lock and latch system of the present invention since the all-metal designed makes it substantially more difficult for a thief to pop the door lock out and thereby open the vehicle door.

In the preferred embodiment, the outside door lock and door handle interface member is connected to two cables, although other types of linkage well known to those skilled in the art or a combination of such linkage elements and cables can also be used. For example, one cable may be used together with another type of mechanical linkage such as a pin. In such an arrangement, the cable may be used to connect the outside door handle to the latch while the pin is used to connect the outside lock to the door latch. It will be appreciated by those skilled in the art that the use of cables substantially enhances the level of security afforded by the lock and latch system of the present invention since such cables are not susceptible to jimmying by a thief using a “slim jim.”

The outside door lock, which, as mentioned above, is installed into the outside door lock and door handle interface member, will be accessible through the outside door handle assembly when these components are installed into the opening in the outer skin of the structural framework of the vehicle door. One of the cables in the outside door lock and door handle interface member is driven by an outside door lock cable actuator which is in turn driven by the outside door lock. The outside door handle assembly includes a mechanical linkage which connects the outside door handle to an outside door handle cable actuator in the outside door lock and door handle interface member when the outside door handle assembly is installed. The other cable in the outside door lock and door handle interface member is driven by the outside door handle cable actuator, which is in turn driven by the linkage in the outside handle assembly.

In the preferred embodiment, the inside door handle and the inside door lock actuator are both contained in a single assembly. Also, in the preferred embodiment, the inside door handle and inside door lock assembly is connected to two cables. One of the cables is driven by the inside door handle, and the other cable is driven by the inside door lock cable actuator. Those skilled in the art will readily appreciate that other types of linkage or a combination of such linkage elements and cables could instead be used.

All four of the cables, from the outside door lock and door handle interface member and the inside door handle and inside door lock assembly, are connected to the door latch. In the preferred embodiment, the door latch used is the device described in U.S. patent application Ser. No. 09/408,993, entitled “Electronic Latch Apparatus and Method,” to Dimig, filed on Sep. 29, 1999, and assigned to the assignee of the present patent application, which is a continuation-in-part of U.S. patent application Ser. No. 09/263,415, to Dimig, filed on Mar. 5, 1999, also assigned to the assignee of the present patent application. U.S. patent application Ser. No. 09/408,993 and U.S. patent application Ser. No. 09/263,415, in their entirety, are hereby incorporated herein by reference.

That electronic door latch is actuated by two cables, with the cable from the inside door handle operating a first control element in the electronic door latch, and the cable from the outside door handle operating a second control element in the electronic door latch. A solenoid-actuated pin is used to lock the electronic door latch, preventing it from being opened from the outside handle if the solenoid has retracted a pin from the second control element.

The lock and latch system of the present invention thus uses the second preferred embodiment of the electronic door latch illustrated in FIGS. 17–31 of the above incorporated by reference U.S. patent application Ser. No. 09/408,993, with two cables being respectively operatively connected to the solenoid armature such that movements of either of the cables may also be used to extend or retract the pin from the solenoid. Accordingly, the cables from either the inside door lock cable actuator or the outside door lock cable actuator are operatively connected to the solenoid such that either of them can extend or retract the pin from the second control element. It will also be apparent to those skilled in the art that two solenoids could instead be used, one with each of the control elements, with the cables operating the inside and outside locks being directly connected to drive two pins, one of which is associated with each of the solenoids.

As mentioned above, the lock and latch system of the present invention is assembled into three modules which are delivered to the motor vehicle manufacturer. The first module thus includes the outside door lock and door handle interface member, the inside door handle and inside door lock assembly, the electronic door latch, and the four cables connecting the first three components. In the preferred embodiment, this module is preassembled in its entirety. The second module is the outside door lock, which is typically a cylinder-type lock which is included in a set of identically-keyed locks for installation into the doors, the ignition switch, and the trunk of the vehicle. The third module is the outside door handle assembly, which includes the outside door handle itself and the mechanical linkage which will be used to connect it to the handle cable actuator in the outside door lock and door handle interface member. The third module also includes the outside handle mounting mechanism which secures the outside door handle assembly in place when the door handle is actuated for the first time. Part of this third module will also be located outside and partially overlying the lock cylinder, with the lock cylinder being accessible through this third module.

In an additional enhancement which is optional, a mounting bracket may be used to support the outside door lock and door handle interface member in a spaced relationship with respect to the electronic door latch. This mounting bracket is both small and flexible, and further facilitates the installation of the components supported therefrom into the structural framework of the vehicle door. In an alternate embodiment, the mounting bracket can also extend between the inside door handle and inside door lock assembly and the electronic door latch to establish a spaced relationship therebetween.

It may therefore be seen that the present invention teaches a locking and latching system of modular construction in which the components of the system are preassembled to the greatest extent possible prior to their installation into the structural framework of a vehicle door. The modular construction of the lock and latch system of the present invention includes the outside and inside door handles, the outside and inside locks, the door latch itself, as well as all necessary linkages between these components. The modular components of the present invention further facilitate the assembly process by being of a design which makes the process of installing them into the structural framework of a vehicle door be as simple as is possible, without requiring the use of specialized tools, thereby further reducing the labor costs associated with assembly. The lock and latch system of the present invention substantially enhances the security of the vehicle by providing a lock and latch system which by virtue of its design has an enhanced level of resistance to manipulation by jimmying with a “slim jim” or similar tool of the type commonly used by car thieves.

Advantageously, the lock and latch system of the present invention includes the outside door handle as a separate modular component, thereby allowing outside door handles to be manufactured in a variety of colors to match exterior vehicle paint colors while allowing the other modular components of the system to be of a single type and color. The preassembled nature of the modular components eliminates the requirement for adjustments to be made during the assembly of the components of the lock and latch system into the structural framework of a vehicle door, thereby further minimizing assembly costs while simultaneously enhancing vehicle quality. The modular components of the lock and latch system of the present invention are also adaptable for use on a variety of different vehicles by merely switching outside door handles and providing different size linkages between the various modular components.

The lock and latch system of the present invention is of a construction which is both durable and long lasting, and which will require little or no maintenance to be provided by the user throughout its operating lifetime. The lock and latch system of the present invention is also of inexpensive construction to enhance its market appeal and to thereby afford it the broadest possible market. Finally, all of the aforesaid advantages and objectives of the lock and latch system of the present invention are achieved without incurring any substantial relative disadvantage.

DESCRIPTION OF THE DRAWINGS

These and other advantages of the present invention are best understood with reference to the drawings, in which:

FIG. 4 is a side view of the outside handle assembly illustrated in FIG. 3 from a first side and with the door handle in its normally retracted position, showing the linkage used to move the ball connector when the door handle is opened, and also showing a retention mechanism in a preinstalled position;

FIG. 5 is a side view of the outside handle assembly similar to the view illustrated in FIG. 4 but with the door handle in its extended position, showing the movement of the linkage and the ball connector, and also showing the retention mechanism in its installed position;

FIG. 6 is a side view of the outside handle illustrated in FIGS. 3 through 5 from a second side and with the door handle in its retracted position following movement of the retention mechanism to its installed position;

FIG. 7 is a plan view of an outside lock assembly from a first side, showing a pin extending from the rear end thereof;

FIG. 8 is a plan view of a portion of the outside lock assembly illustrated in FIG. 7 from a second side, showing the spring-loaded retention mechanism used to retain the outside lock assembly in place;

FIG. 9 is a plan view of the outside lock assembly illustrated in FIGS. 7 and 8 from the front end thereof;

FIG. 10 is a plan view of the outside lock assembly illustrated in FIGS. 7 through 9 from the rear end thereof;

FIG. 19 is a plan view of an inside door handle and inside door lock assembly, showing portions of two cables connected to the assembly;

DETAILED DESCRIPTION OF THE PREFERRED EMBODIMENT

The preferred embodiment of the lock and latch system of the present invention consists of three modules which are preassembled prior to delivery to the manufacturer assembling the motor vehicles into which the lock and latch system will be incorporated. The first module consists of three primary components, namely an outside door lock and door handle interface member, an inside door handle and inside door lock assembly, and an electronic door latch, with four cables being used to connect these three components. These three components will be discussed separately, prior to a discussion about their incorporation into a single module. The second module is the outside lock, which in the preferred embodiment is a cylinder-type lock. The third module is the outside door handle assembly, which will also be discussed by itself.

Figure 1:
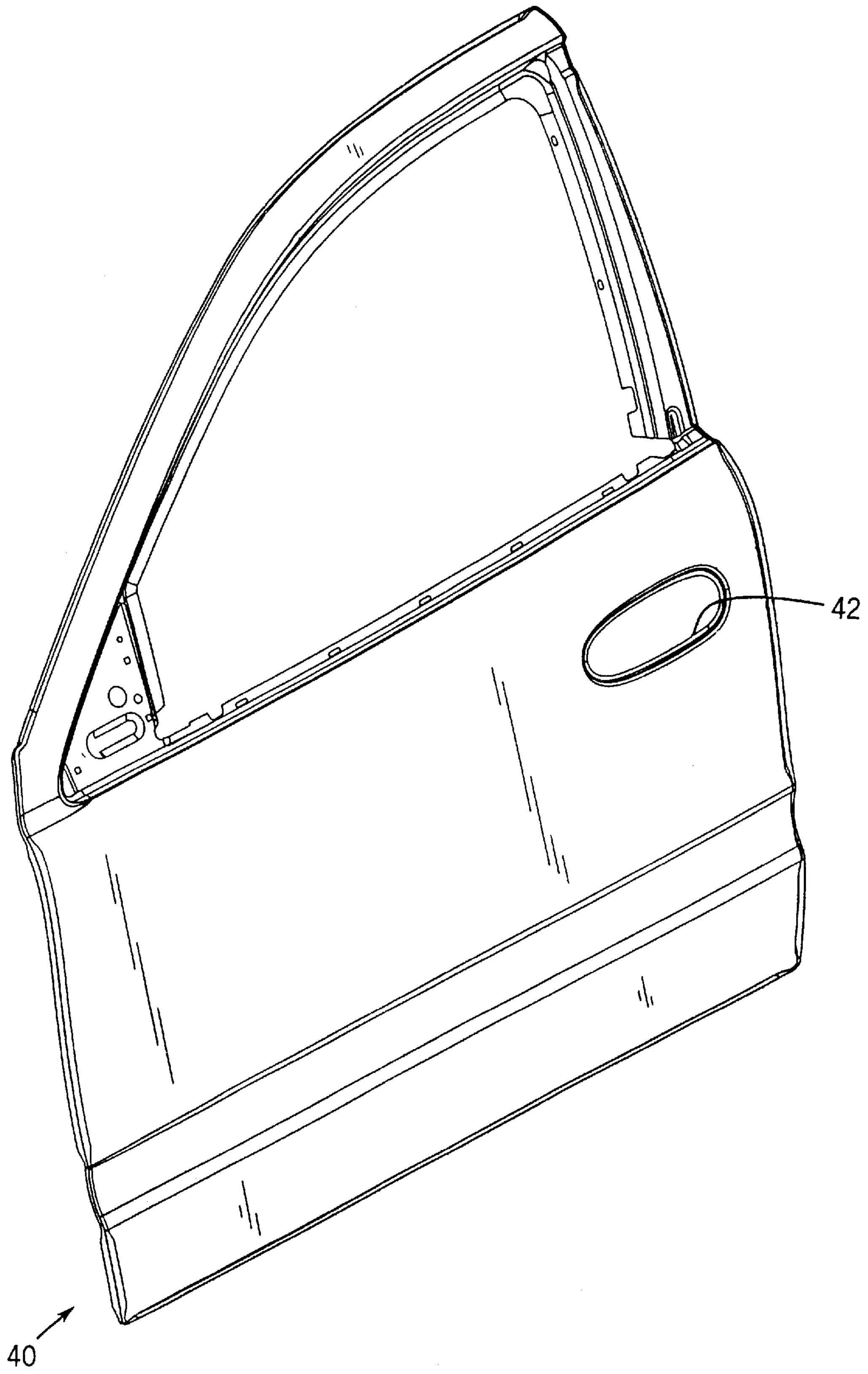
FIG. 1 is an isometric view of the structural framework of a vehicle door from the outside, showing an opening in which the outside handle and outside lock will be mounted.
Figure 2:
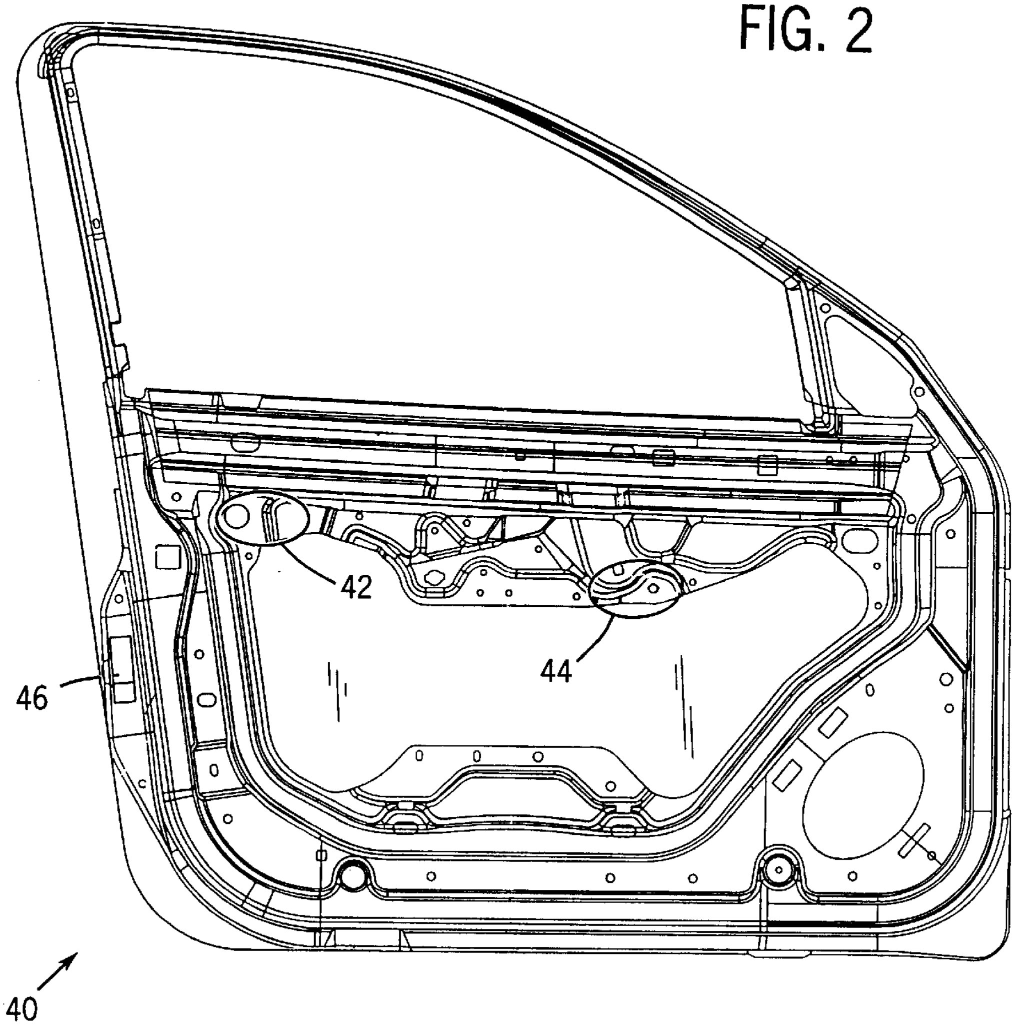
FIG. 2 is an isometric view of the structural framework of the vehicle door illustrated in FIG. 1 from the inside, with the locations at which the door latch, the outside handle and outside lock, and the inside handle and inside lock will be mounted highlighted.
Figure 3:
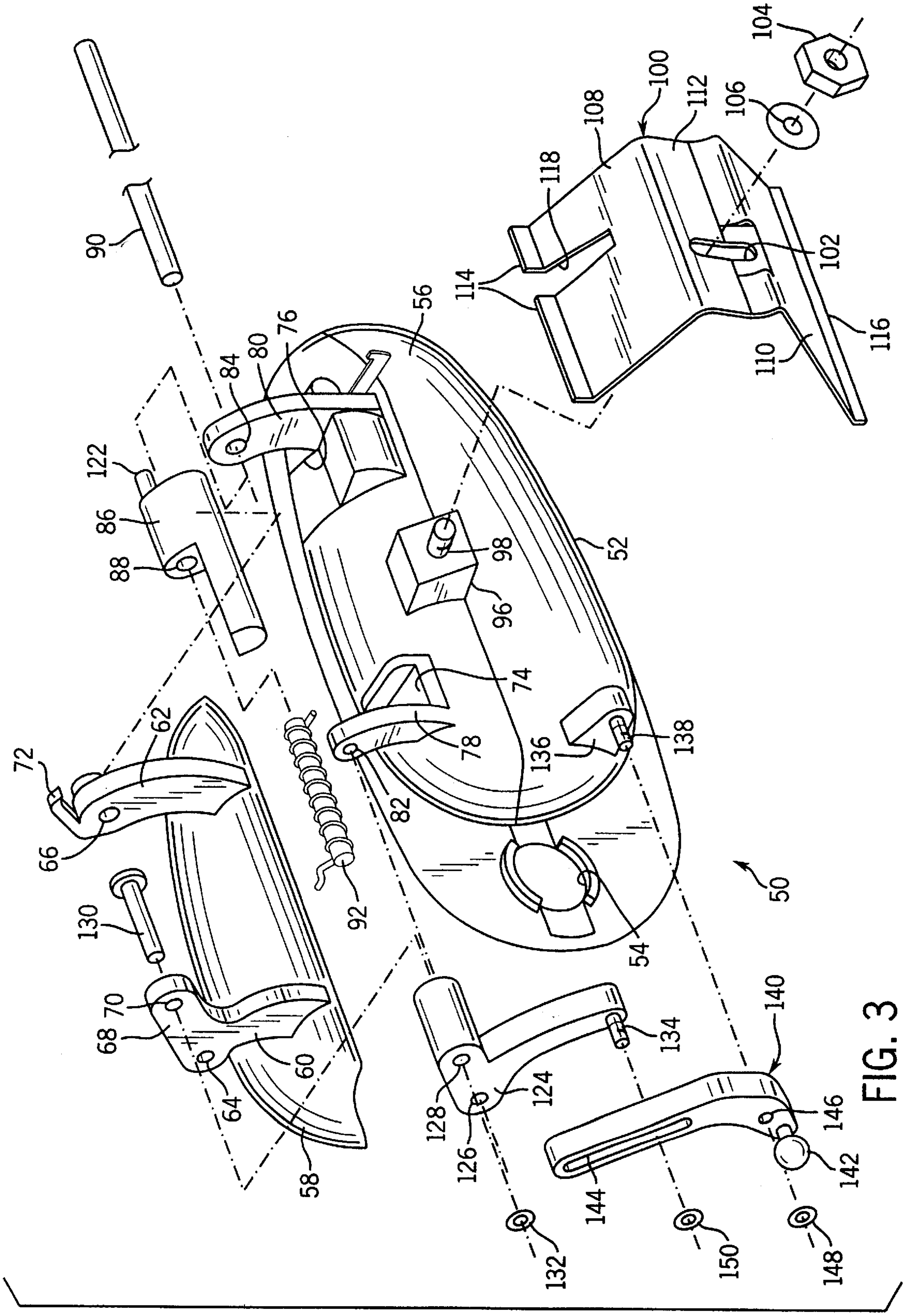
FIG. 3 is an exploded view of an outside handle assembly constructed according to the teachings of the present invention, showing an aperture and a ball connector at the location at which an outside door lock and door handle interface member will be mounted.
Figure 11:
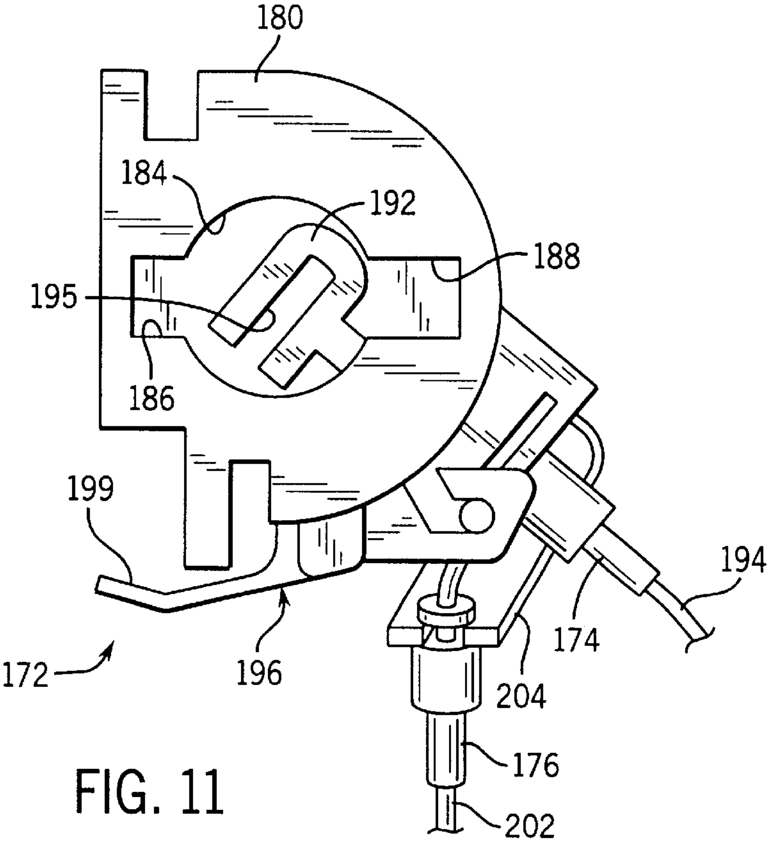
FIG. 11 is a front plan view of an outside door lock and door handle interface member from the front side thereof, showing portions of two cables connected to the assembly, the interface member having a recess therein for receiving the outside lock assembly illustrated in FIGS. 7 through 10, the recess having an outside door lock cable actuator attached to one of the cables contained therein, and also showing a pivotable outside door handle cable actuator attached to the other of the cables at one end thereof and having a U-shaped fork at the other end thereof.

Referring first to FIGS. 1 and 2, the structural framework of a vehicle door 40 is illustrated from the outside in FIG. 1 and from the inside in FIG. 2. The structural framework of the vehicle door 40 has an opening 42 in the outer skin of the structural framework of the vehicle door 40 (best illustrated in FIG. 1, illustrated schematically in FIG. 2) into which an outer handle assembly and an outside door lock (neither of which are illustrated in FIGS. 1 or 2) will be mounted. The structural framework of the vehicle door 40 also has the location at which an inside door handle and inside door lock assembly (not illustrated in FIGS. 1 or 2) will go indicated by the reference numeral 44 and the location at which a door latch (not illustrated in FIGS. 1 or 2) will go indicated by the reference numeral 46.

Referring next to FIGS. 3 through 6, the construction of the outside door handle assembly 50 which is used in the preferred embodiment of the present invention is illustrated. All of the various components of the outside door handle assembly 50 are assembled onto an outside door handle housing member 52, which is of a size and configuration to fit partially into the opening 42 in the outer skin of the structural framework of the vehicle door 40 (shown in FIG. 1). The outer periphery of the outside door handle housing member 52 is larger than the opening 42 in the outer skin of the structural framework of the vehicle door 40.

Located near one side of the outside door handle housing member 52 is an aperture 54 which will receive the proximal end (the end next to or nearest the point of attachment or origin) of an outside door lock (not illustrated in FIGS. 3 through 6). Located intermediate the aperture 54 and the other end of the outside door handle housing member 52 is a concave portion 56 which will receive an outside door handle 58 therein in a flush manner when the outside door handle 58 is not actuated.

The outside door handle 58 has two support arms 60 and 62 located near opposite ends thereof. The support arm 60 has an aperture 64 located near the end thereof remote from the point of attachment of the support arm 60 to the outside door handle 58. The support arm 62 has an aperture 66 located near the end thereof remote from the point of attachment of the support arm 62 to the outside door handle 58.

The support arm 60 has an extension 68 projecting in the same plane as the support arm 60 from the end thereof remote from the point of attachment of the support arm 60 to the outside door handle 58. The distal end (the end situated away from the point of attachment or origin) of the extension 68 has an aperture 70 located therein. The support arm 62 has a projection 72 extending from the side thereof near the end thereof remote from the point of attachment of the support arm 62 to the outside door handle 58.

The outside door handle housing member 52 has two openings 74 and 76 located near opposite ends of the concave portion 56 to admit the support arms 60 and 62, respectively, therethrough. Extending from the outside door handle housing member 52 on the back side of the concave portion 56 immediately outside the openings 74 and 76 are two handle mounting arms 78 and 80. The handle mounting arms 78 and 80 have apertures 82 and 84, respectively, located near their ends which are remote from their point of attachment to the outside door handle housing member 52.

The mechanism used to mount the outside door handle assembly 50 is similar to the apparatus taught by U.S. Pat. No. 5,706,554, which has been incorporated by reference above. A cam member 86 having an aperture 88 extending therethrough is mounted adjacent the handle mounting arm 80 using a pin 90. Also mounted on the pin 90 is a spring 92, which bears against the support arm 60 of the outside door handle 58 and the inside surface of the outside door handle housing member 52, and operates to keep the outside door handle 58 in its flush position with respect to the outside door handle housing member 52.

The pin 90 extends sequentially through the aperture 84 in the handle mounting arm 80, the aperture 66 in the support arm 62 of the outside door handle 58, the aperture 88 in the cam member 86, the spring 92, the aperture 64 in the support arm 60, and the aperture 82 in the handle mounting arm 78. In the preferred embodiment, the pin 90 has an interference fit with one or both of the apertures 82 and 84 in the handle mounting arms 78 and 80, respectively, although other ways of retaining the pin 90 in place will be readily apparent to those skilled in the art.

Extending from the back side of the concave portion 56 of the outside door handle housing member 52 is an essentially square lock support post 96, which is located between and slightly below the level of the handle mounting arms 78 and 80. Extending from the distal end of the lock support post 96 is a threaded post 98. Mounted on the threaded post 98 is a lock plate 100 which has a vertical slot 102 therein through which the threaded post 98 extends. A nut 104 and a washer 106 are used to retain the lock plate 100 in place on the threaded post 98, although, as can best be seen in FIGS. 5 and 6, the nut 104 is not fully tightened on the threaded post 98. Other matters of retaining the lock plate 100 in place on the threaded post 98 which will be readily apparent to those skilled in the art may alternatively be used.

The lock plate 100 may be seen as having three primary portions, namely two planar portions 108 and 110 which are both connected to an irregular central portion 112, the vertical slot 102 being located in the irregular central portion 112. The two planar portions 108 and 110 are at an angle of approximately 60 degrees with respect to each other, and each have small outwardly extending flanges 114 and 116 located at their respective distal edges. A slot 118 is located in the distal edge of the planar portion 108 to admit the end of the spring 92 which bears on the outside door handle housing member 52.

Note that when the lock plate 100 is in the position illustrated in FIG. 4 (the installation position), the flange 114 on the planar portion 108 of the lock plate 100 is spaced slightly away from the top edge of the outside door handle housing member 52, and the flange 116 on the planar portion 110 of the lock plate 100 is spaced well away from the bottom edge of the outside door handle housing member 52. In this position, the outside door handle assembly 50 can be installed into place in the opening 42 in the outer skin of the structural framework of the vehicle door 40 (shown in FIG. 1).

The irregular central portion 112 is configured such than when the lock plate 100 is moved downward from the position illustrated in FIG. 4 to the position illustrated in FIGS. 5 and 6 (the installed position), the flanges 114 and 116 will move into close contact with the top and bottom edges of the outside door handle housing member 52. Once in this position, a finger 120 extending from the planar portion 110 near its point of attachment to the irregular central portion 112 will prevent the lock plate 100 from returning to its former position, thereby gripping the steel surrounding the opening 42 in the outer skin of the structural framework of the vehicle door 40 (shown in FIG. 1) tightly.

The lock plate 100 is moved from its installation position to its installed position by the clockwise rotation of the cam member 86 when viewed along the axis of the pin 90 from the perspective of the handle mounting arm 78. This movement of the cam member 86 occurs when the outside door handle 58 is actuated (pulled outwardly from the concave portion 56 in the outside door handle housing member 52). The projection 72 on the support arm 62 of the outside door handle 58 bears against a pin 122 extending from the side of the cam member 86 facing the handle mounting arm 80, causing the cam member 86 to rotate against the planar portion 108 of the lock plate 100, pushing it downward from the installation position to the installed position.

A T-shaped linkage member 124 is mounted onto the support arm 60 which extends from the outside door handle 58. The T-shaped linkage member 124 has apertures 126 and 128 extending through opposite ends of the top of the T. The end of the pin 90 preferably extends beyond the aperture 64 in the support arm 60 and into the aperture 126 in the T-shaped linkage member 124.

A bolt 130 extends through the aperture 70 in the support arm 60 and the aperture 128 in the T-shaped linkage member 124, and is secured in place by a nut 132. The base of the T is curved, as best seen in FIG. 4. Extending from the side of the T-shaped linkage member 124 at the bottom of the T is a mounting post 134 which has a threaded distal tip.

A linkage support arm 136 extends from the back of the outside door handle housing member 52 well below the position of the handle mounting arm 78. Extending from the side of linkage support arm 136 near the distal end thereof is a mounting post 138 which has a threaded distal tip.

Mounted on the mounting post 138 is an intermediate linkage member 140 which is shaped like a hockey stick. Mounted on the side of the lower end of the intermediate linkage member 140 at the distal tip thereof is a ball 142 which will interface with an outside door lock and door handle interface member (not illustrated in FIGS. 3 through 6). Located in the side of the intermediate linkage member 140 from the top to a position about two-thirds of the way down the "handle" is a slot 144. Also located on the side of the lower end of the intermediate linkage member 140 proximally from the ball 142 is an aperture 146.

The intermediate linkage member 140 is mounted onto the linkage support arm 136 with the mounting post 138 extending through the aperture 146 in the intermediate linkage member 140. The mounting post 134 of the T-shaped linkage member 124 extends through the slot 144 in the intermediate linkage member 140. A nut 148 is screwed onto the threaded distal tip of the mounting post 138 to retain the intermediate linkage member 140 in place on the mounting post 138. A nut 150 is screwed onto the threaded distal tip of the mounting post 134 to retain the mounting post 134 in the slot 144 of the intermediate linkage member 140.

Referring now particularly to FIGS. 4 and 5, it will be appreciated by those skilled in the art that the ball 142 on the intermediate linkage member 140 moves vertically (and to a lesser extent horizontally) as the outside door handle 58 goes from a fully retracted position in FIG. 4 to a fully actuated position in FIG. 5. This movement of the ball 142 will be used to operate a handle cable actuator in the outside door lock and door handle interface member (not illustrated in FIGS. 3 through 6).

Finally, FIGS. 4 through 6 also show a mounting gasket 152 which is placed on the inside of the outside door handle housing member 52 around the perimeter thereof. The mounting gasket 152 will be located intermediate the inside of the outside door handle housing member 52 and the steel of the outer skin of the structural framework of the vehicle door 40 (shown in FIG. 1) when the outside door handle assembly 50 is installed on the structural framework of the vehicle door 40. In the preferred embodiment, the outside door handle housing member 52 and the outside door handle 58 can both be made of molded plastic material.

While the outside door handle 58 illustrated herein is of the paddle type, it will be readily appreciated to those skilled in the art that either the paddle type or the pull strap type door handle could be used in conjunction with the lock and latch system of the present invention. In addition, either of these types of door handles could alternately be mounted and pivot with respect either to an outside door handle housing member which is a part of the second component, to the sheet metal of the outer skin of the structural framework of the vehicle door, or to the outside door lock and door handle interface member. Such changes and substitutions will certainly be readily apparent to one skilled in the art once the principles of the present invention have been made known to that person.

Referring next to FIGS. 7 through 10, an outside door lock 160 is illustrated. The outside door lock 160 illustrated is a cylinder-type lock having a proximal end (best shown in FIG. 9) into which a key (not shown herein) may be inserted. It the correct key is inserted into the outside door lock 160, a cylindrical projection 162 located at the distal end of the outside door lock 160 will turn. Located on one side of the cylindrical projection 162 (best shown in FIG. 10) is a pin 164 which extends from the distal end of the cylindrical projection 162 and rotates with the cylindrical projection 162 when the correct key is inserted into the outside door lock 160 and turned.

Located on one side of the outside door lock 160 is a small projection 166, while located on the other side of the outside door lock 160 is a larger projection 168. The larger projection 168 is wider than is the small projection 166, as best shown in FIGS. 9 and 10. This ensures the proper orientation of the outside door lock 160 when it is inserted into an outside door lock and door handle interface member (not illustrated in FIGS. 7 through 10). Extending from one side of the larger projection 168 is a spring-loaded tapered projection 170 which will be used to retain the outside door lock 160 in the outside door lock and door handle interface member when it is so installed Referring now to FIGS. 11 through 15, an outside door lock and door handle interface member 172 (and, in FIGS. 13 and 14, two components thereof) is illustrated. The outside door lock and door handle interface member 172 serves three functions: it provides a mounting location for the outside door lock 160 (shown in FIGS. 7 through 10); it provides a coupling mechanism for interfacing rotary motion of the cylinder lock in the outside door lock 160 to linear motion in an outside door lock cable 174; and it provides a coupling mechanism for interfacing movement of the ball 142 of the intermediate linkage member 140 (best illustrated in FIGS. 4 and 5, which occurs when the outside door handle 58 is actuated) to linear motion in an outside door release cable 176.

The outside door lock and door handle interface member 172 includes a housing member 178 which is hollow at one end to receive the outside door lock 160 (illustrated in FIGS. 7 through 10) therein. The end of the housing member 178 which has the opening therein has an enlarged head portion 180 which has a contoured recess 182 located in a portion of the sides thereof. This contoured recess 182 is configured to precisely fit the opening 42 in the outer skin of the structural framework of the vehicle door 40 (shown in FIGS. 1 and 16), with the portions of the enlarged head portion 180 which surround the recess on both sides thereof acting to retain the outside door lock and door handle interface member 172 in place in the opening 42.

Figure 16:
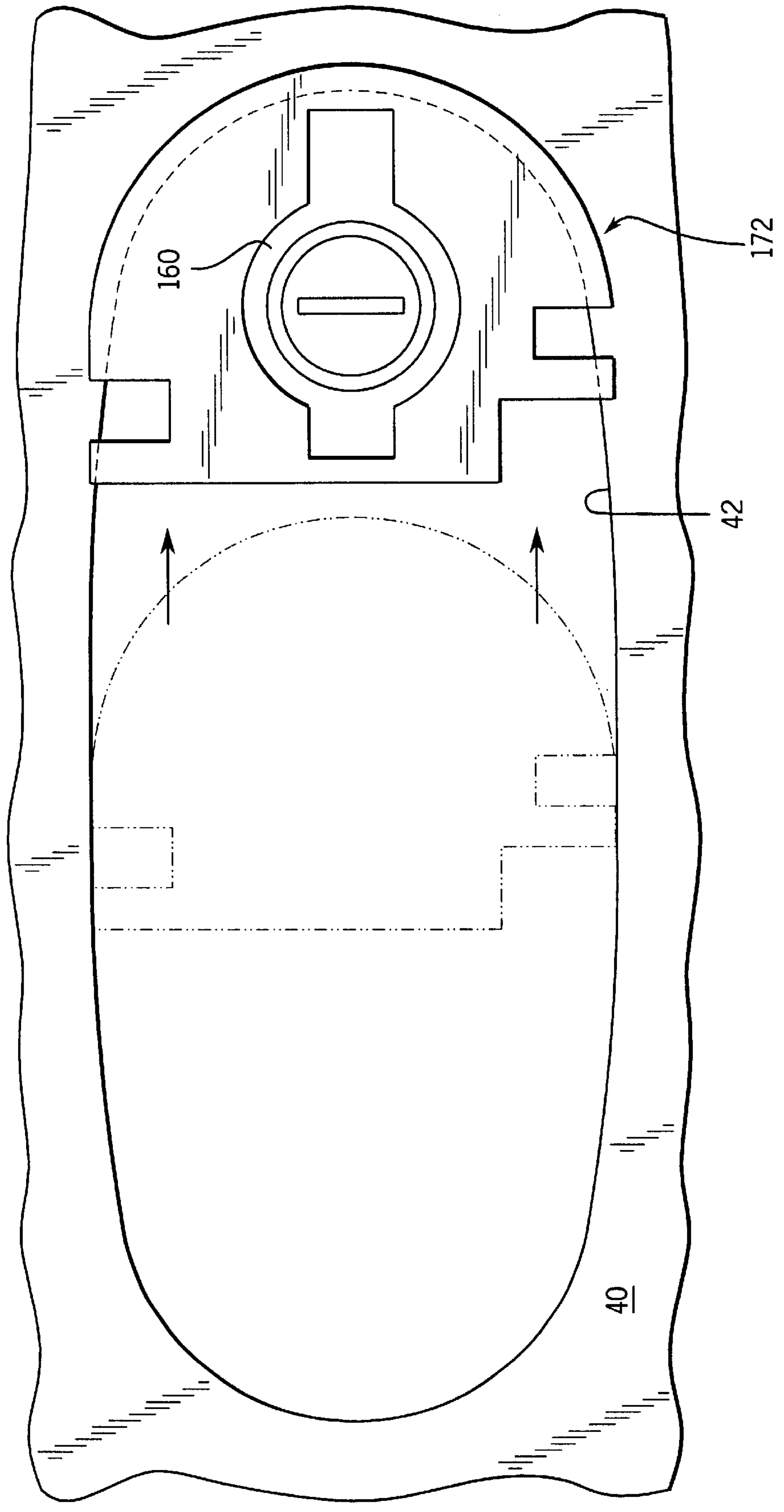
FIG. 16 is a plan view of the portion of the outer skin of the structural framework of the vehicle door 40 (shown in FIG. 1) having the opening 42 therein, showing the installation and placement of the outside door lock and door handle interface member (shown in FIGS. 11, 12, and 15)

Referring for the moment to FIG. 16, the outside door lock and door handle interface member 172 is installed into the opening 42 in the outer skin of the structural framework of the vehicle door 40 (illustrated in FIG. 1) by placing it into the center of the opening 42 (which is wider than at the ends of the opening 42) where it is shown in phantom lines, and sliding it (in the direction of the arrows) into place at an end of the opening 42. In this position, the sheet metal at the right side of the opening 42 in the outer skin of the structural framework of the vehicle door 40 will be engaged within the contoured recess 182 of the outside door lock and door handle interface member 172. The outside door handle assembly 50 (illustrated in FIGS. 3 through 6) may then be installed into the opening 42, where it will engage the outside door lock and door handle interface member 172 and retain it in place.

Referring again to FIGS. 11 through 15, the opening in the outside door lock and door handle interface member 172 has a cylindrical opening portion 184 which is centrally located therein, with a narrower rectangular opening portion 186 on one side thereof and a wider rectangular opening portion 188 on the other side thereof. A retaining bar 190 (as best seen in FIG. 12) is located on one side of the cylindrical opening portion 184 to engage the spring-loaded tapered projection 170 of the outside door lock 160 when it is installed in the outside door lock and door handle interface member 172.

Figure 12:
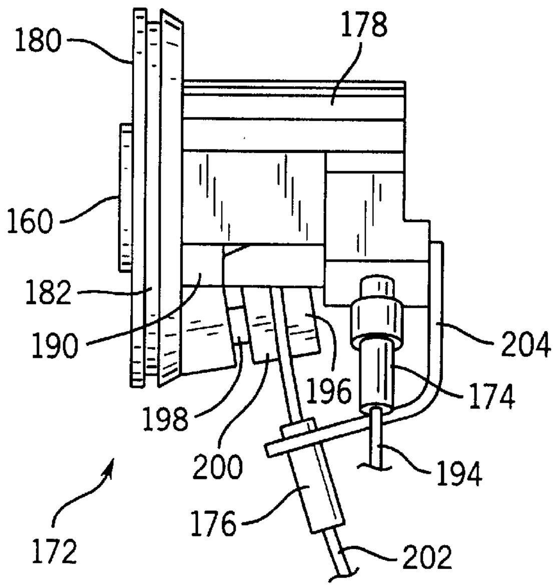
FIG. 12 is a side plan view of the outside door lock and door handle interface member illustrated in FIG. 11, showing a recess located about the periphery of the housing of the interface member which will be used to mount the interface member.

It may be seen in FIG. 12 that the outside door lock 160, when installed in the outside door lock and door handle interface member 172, extends slightly above the surface of the enlarged head portion 180. This portion of the outside door lock 160 will fit into the aperture 54 of the outside door handle housing member 52 (illustrated in FIG. 3) when the outside door lock and door handle interface member 172 and the outside door handle housing member 52 are installed into the opening 42 in the outer skin of the structural framework of the vehicle door 40 (as illustrated in FIG. 16). It will be appreciated by those skill in the art that typically the outside door lock 160 is included in a set of identically-keyed locks for installation into the doors, the ignition switch, and the trunk of the vehicle. Accordingly, the outside door lock 160 will not be installed into the outside door lock and door handle interface member 172 until the lock and latch system is being installed into a motor vehicle.

Figure 13:
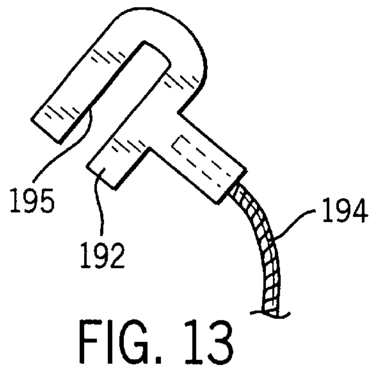
FIG. 13 is a plan view of the cable actuator illustrated in FIG. 11 in the recess in the outside door lock and door handle interface member.

Located in the back of the cylindrical opening portion 184 in the housing member 178 is an outside door lock cable actuator 192 (which is best shown in FIG. 13). The outside door lock cable actuator 192 is U-shaped, with the middle of one side of the U being connected to one end of a cable wire 194. The cable wire 194 is located inside the outside door lock cable 174. The pin 164 on the cylindrical projection 162 of the outside door lock 160 (best illustrated in FIGS. 8 and 10) will fit inside the interior of the U (which is identified by the reference number 195) when the outside door lock 160 is installed into the outside door lock and door handle interface member 172. Thus, it will be appreciated by those skilled in the art that when a key (not illustrated herein) is placed into the outside door lock 160 and rotated, rotating the cylindrical projection 162 and the pin 164, the pin 164 will actuate the outside door lock cable actuator 192 and cause the cable wire 194 to be moved inside the outside door lock cable 174.

Figure 14:
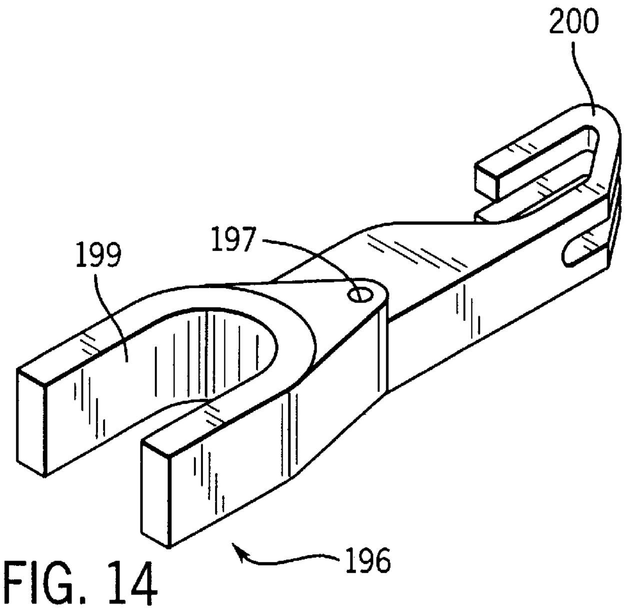
FIG. 14 is an isometric view of the outside door handle cable actuator illustrated in FIG. 11 as being pivotally mounted on the outside door lock and door handle interface member, showing a centrally-located aperture extending therethrough, the curved end for attachment to the cable, and the U-shaped fork which is the other end thereof.
Figure 15:
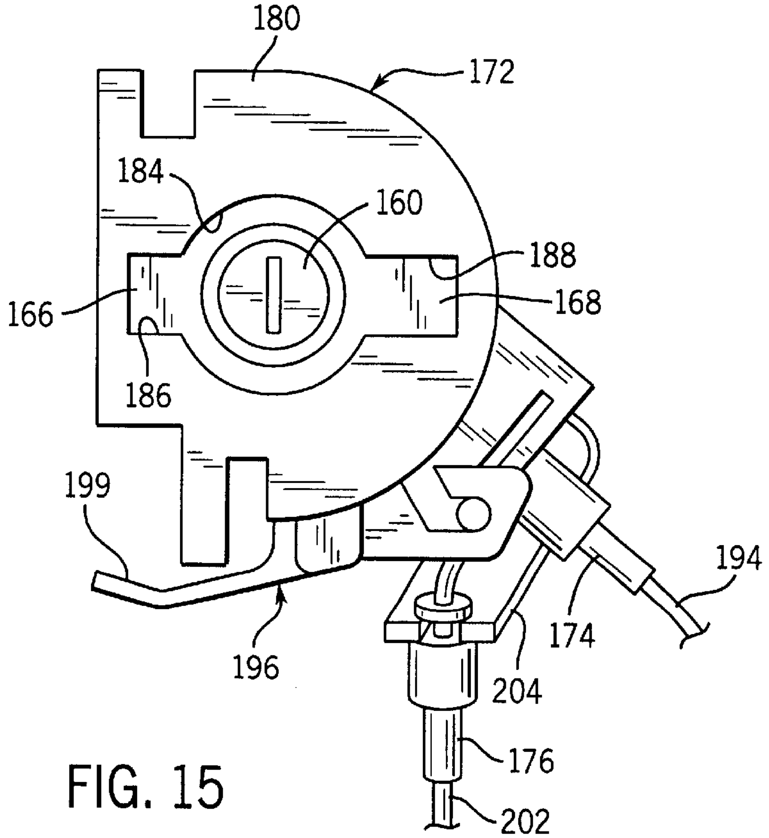
FIG. 15 is a front plan view of the outside door lock and door handle interface member illustrated in FIGS. 11 and 15 from the front side thereof, showing the outside lock assembly illustrated in FIGS. 7 through 10 installed therein.

Also mounted on the outside door lock and door handle interface member 172 is an outside door handle cable actuator 196 (which is best shown in FIG. 14). The outside door handle cable actuator 196 has an aperture 197 which is centrally located therein, and is pivotally mounted on a pivot pin 198 extending from the side of the housing member 178. One end of the outside door handle cable actuator 196 is U-shaped (as identified by the reference numeral 199), and this U-shaped end 199 will engage the ball 142 on the intermediate linkage member 140 of the outside door handle assembly 50 (illustrated in FIGS. 4 and 5). The other end of the outside door handle cable actuator 196 (which is indicated generally by the reference numeral 200) is connected to one end of a cable wire 202. The cable wire 202 is located inside the outside door lock cable 176. The outside door lock cable 176 is secured to the outside door lock and door handle interface member 172 by a bracket 204.

Thus, it will be appreciated by those skilled in the art that when the outside door handle 58 of the outside door handle assembly 50 (illustrated in FIGS. 4 and 5) is actuated, the ball 142 on the intermediate linkage member 140 will move, causing a corresponding movement of the outside door handle cable actuator 196. As the outside door handle cable actuator 196, moves, the cable wire 202 inside the outside door release cable 176 will move as well.

Figure 17:
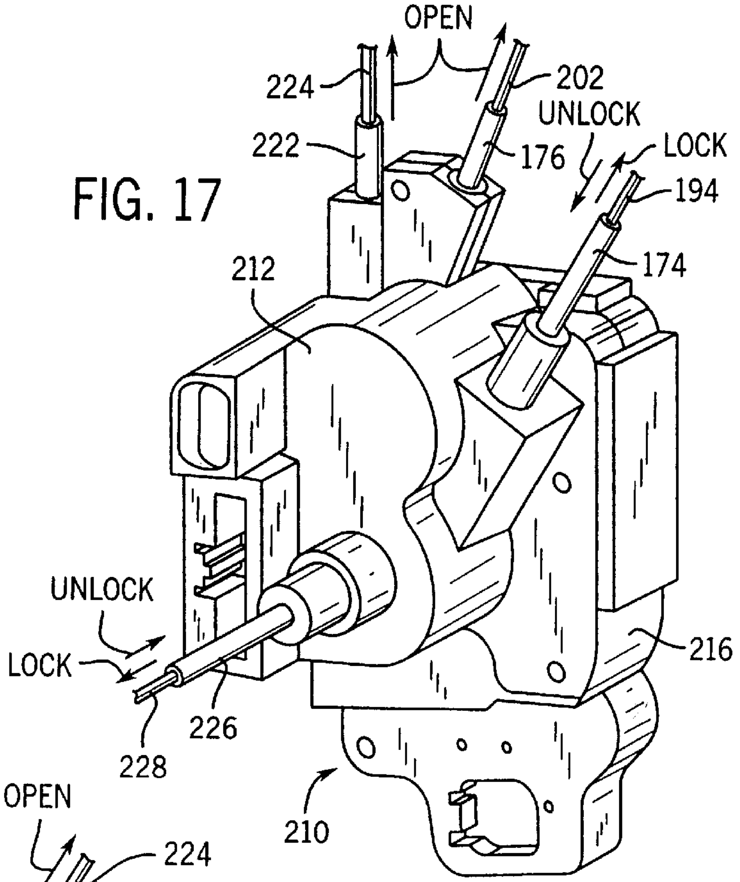
FIG. 17 is an isometric view of a door latch assembly from the front side, showing portions of four cables connected to the door latch assembly.
Figure 18:
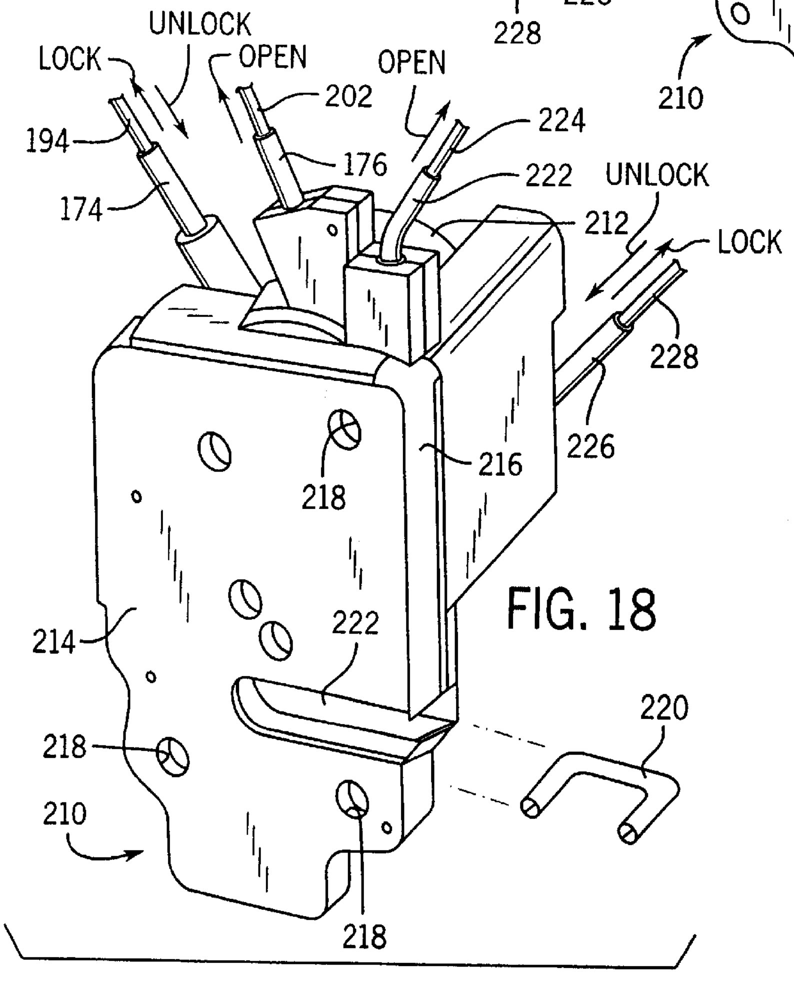
FIG. 18 is a rear isometric view of the door latch assembly showing how a striker mounted on the vehicle body is engaged and retained by a ratchet in the door latch assembly.

Referring now to FIGS. 17 and 18, an electronic door latch 210 is illustrated which is the second preferred embodiment of the electronic door latch illustrated in FIGS. 17–31 of U.S. patent application Ser. No. 09/408,993, which has been incorporated by reference above. The preferred embodiment electronic door latch 210 of the present invention uses two cables which are respectively operatively connected to the solenoid such that movements of the cables may also be used to extend or retract the pin from the second control element. Rather than repeat the extensive technical description of the electronic door latch described in the incorporated by reference application, only the application of it will be described herein.

FIGS. 17 and 18 illustrate the electronic door latch 210, which has a front cover 212, a rear mounting plate 214, and a housing 216 which together enclose the internal elements and mechanisms of the electronic door latch 210. The rear mounting plate 214 has a plurality of threaded apertures 218 which may be utilized to secure the electronic door latch 210 to the structural framework of the vehicle door 40 (in the position illustrated in FIG. 2).

The electronic door latch 210 operates to secure the vehicle door 40 by releasably engaging and retaining a striker 220 mounted on a vehicle body (not illustrated herein) The electronic door latch 210 utilizes a ratchet 222 (also known as a fork bolt) which is rotatably mounted within the housing 216. The electronic door latch 210, like the electronic door latch described in the incorporated by reference patent application, has two control elements located therein, which are described in the above-incorporated by reference U.S. patent application Ser. No. 09/408,993.

Two of the cables attached to the electronic door latch 210 are actuated by the outside door handle 58 (illustrated in FIG. 5) and the inside door handle (which has not yet been described herein), respectively. The outside door release cable 176 is secured to the housing 216, and has a cable wire 202 contained therein. The end of the cable wire 202 is attached to the second control element, which is entirely contained within the housing 216. An inside door release cable 222 is secured to the housing 216, and has a cable wire 224 contained therein. The end of the cable wire 224 is connected to the first control element, which is also entirely contained within the housing 216.

The outside door lock cable 174 is connected to the front cover 212, and contains the cable wire 194. An inside door lock cable 226 is also connected to the front cover 212, and contains a cable wire 228. In the preferred embodiment illustrated herein, the outside door lock cable 174 and the inside door lock cable 226 are both used to lock the second control element. When the second control element is locked, and the outside door release cable 176 is pulled, the electronic door latch 210 will not unlatch. When the second control element is unlocked, and the outside door release cable 176 is pulled, the electronic door latch 210 will unlatch. For more complete understanding of the operation of the electronic door latch 210, the reader is referred to the above-incorporated by reference U.S. patent application Ser. No. 09/408,993. In the embodiment illustrated herein, the first control element is never locked (although it will be appreciated by those skilled in the art that it could be locked if the inside door lock cable 226 was connected to it instead of the second control element).

Referring next to FIG. 19, an inside door handle and inside door lock assembly 232 is illustrated for installation in the location 44 on the structural framework of the vehicle door 40 (illustrated in FIG. 2). The inside door handle and inside door lock assembly 232 has a base member 234 having a mounting stub 236 on the bottom edge thereof and a mounting tab 238 having an aperture 240 therethrough on the left side edge thereof. An inside door handle 242 is hingedly mounted onto the base member 234, and is biased into the position illustrated in FIG. 19.

Actuating the inside door handle 242 is accomplished by pulling its unconnected end outwardly from the base member 234, which pulls the cable wire 224 from the end of the inside door release cable 222 shown in FIG. 19. An inside door lock actuator 244 is also shown in FIG. 19 to be of the rocker type. Pushing on its right side (as shown in FIG. 19) pulls the cable wire 228 from the end of the inside door lock cable 226 shown in FIG. 19, locking the electronic door latch 210 (shown in FIGS. 17 and 18). Pushing on the left side of the inside door lock actuator 244 pushes the cable wire 228 back into the inside door lock cable 226, unlocking the electronic door latch 210. The mechanisms used to connect the inside door handle 242 to the inside door release cable 222 and the inside door lock actuator 244 to the inside door lock cable 226 are not shown in greater detail since they are of a simple nature which will be readily apparent to one skilled in the art. In addition, one skilled in the art will also appreciate that instead of the inside door handle and inside door lock assembly 232 being used, a separate inside door handle assembly (not illustrated herein) and inside door lock assembly (not illustrated herein) could instead be used.

In another alternative embodiment, the inside door handle and inside door lock assembly 232 may comprise a fourth component which is not initially connected to the rest of the first component (the electronic door latch 210, the outside door handle assembly 50, and the cables between components 174, 176, 222, and 226). In this alternate embodiment, the first component would, however, include cables 222 and 226 which will be connected to the mechanism of the inside door handle and inside door lock assembly 232. Typically, while the rest of the first component is installed in the structural framework of the vehicle door 40, these cables 222 and 226 will extend out of the vehicle door 40 to allow them to be connected to the inside door handle and inside door lock assembly 232. Thus, in this alternate embodiment, following the connection of the first and fourth components together, the inside door handle and inside door lock assembly 232 would be installed into the structural framework of the vehicle door 40.

Figure 20:
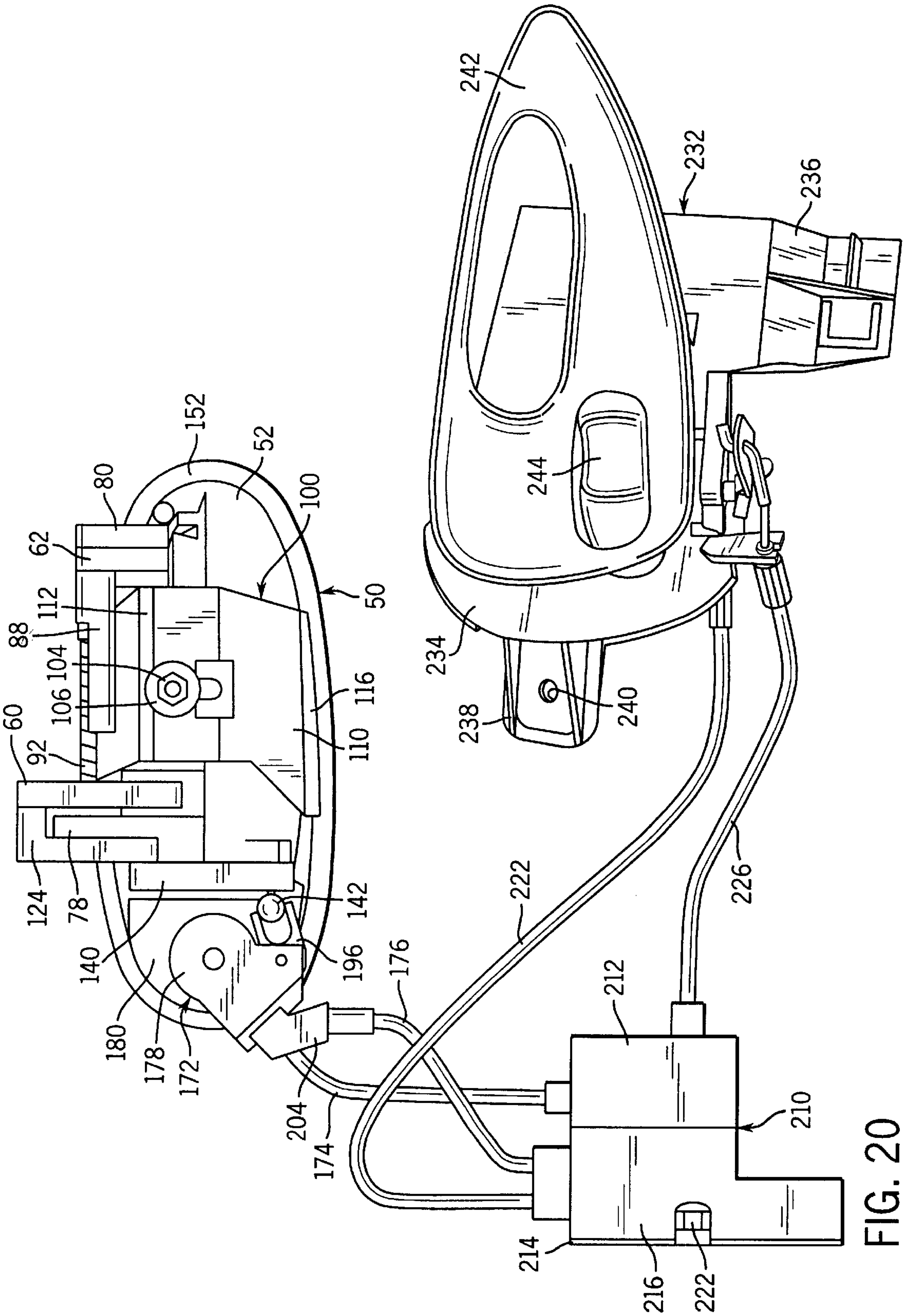
FIG. 20 is a plan view depicting the door latch assembly illustrated in FIGS. 17 and 18 and the outside door lock and door handle interface member illustrated in FIGS. 11, 12, and 15 with two cables interconnecting them, also showing two cables interconnecting the door latch assembly and the inside door handle and inside door lock assembly illustrated in FIG. 19, and also showing the outside door lock and door handle interface member positioned in engagement with the outside handle illustrated in FIGS. 3 through 6.

Referring now to FIG. 20, the entire lock and latch system of the present invention is illustrated in an assembled form. Note particularly the four cables between the components. The outside door lock cable 174 and the outside door release cable 176 extend between the outside door lock and door handle interface member 172 and the electronic door latch 210, and the inside door release cable 222 and the inside door lock cable 226 extend between the inside door handle and inside door lock assembly 232 and the electronic door latch 210. All four of the cables in the preferred embodiment of the present invention are Bowden cables which transfer the motions of the various handles and lock mechanisms to the door latch.

It will be appreciated by those skilled in the art that other types of linkage or a combination of such other types of linkage elements together with cables could be used instead of an all cable system. For example, a substitute which may be made for one of the cables is another type of mechanical linkage such as a pin. In such an arrangement, the pin may be used, for example, to connect the outside lock to the door latch instead of using the outside door lock cable 174. It will, however, be appreciated by those skilled in the art that the use of cables substantially enhances the level of security afforded by the lock and latch system of the present invention since such cables are not susceptible to jimmying by a thief using a "slim jim."

Figure 21:
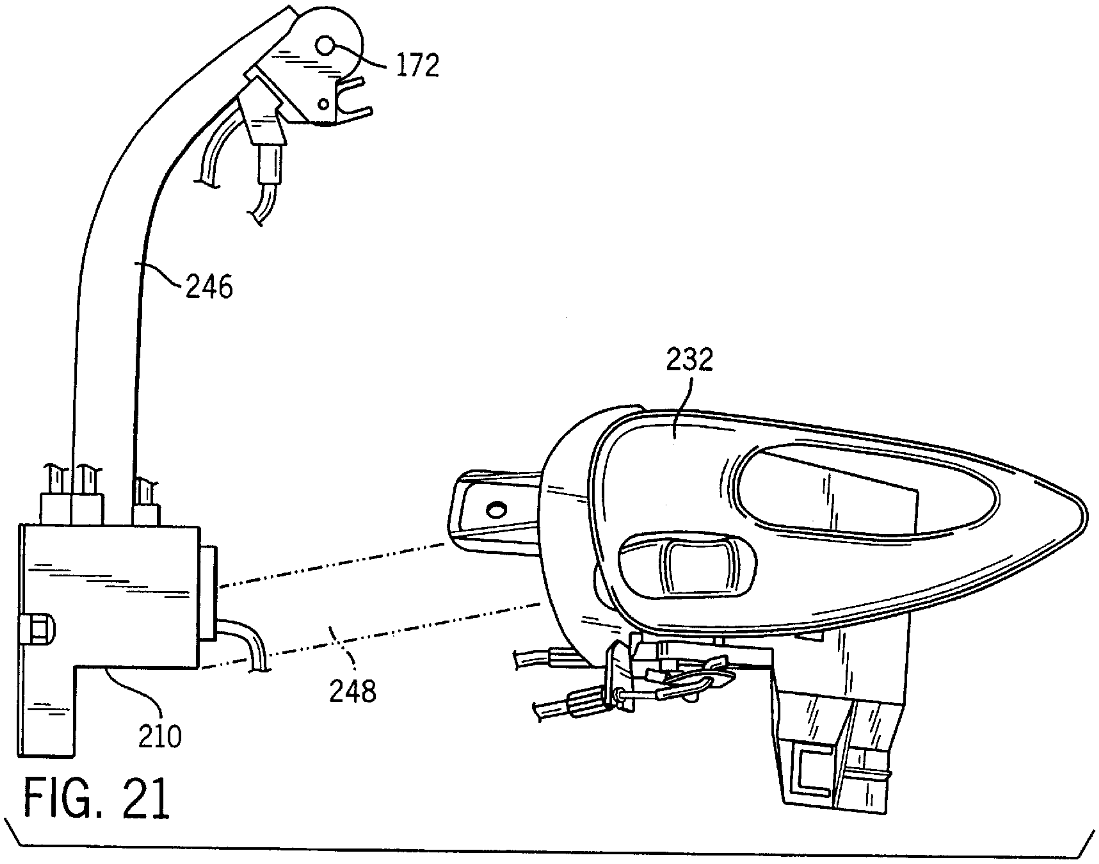
FIG. 21 is a schematic depiction from the side of a mounting bracket used to interconnect the door latch assembly illustrated in FIGS. 17 and 18 with the outside door lock and door handle interface member illustrated in FIGS. 11, 12, and 15, showing in dotted lines an optional extension of the door bracket which may be used to interconnect the door latch and the inside door handle and inside door lock assembly illustrated in FIG. 19, with the cables being omitted for clarity.
Figure 22:
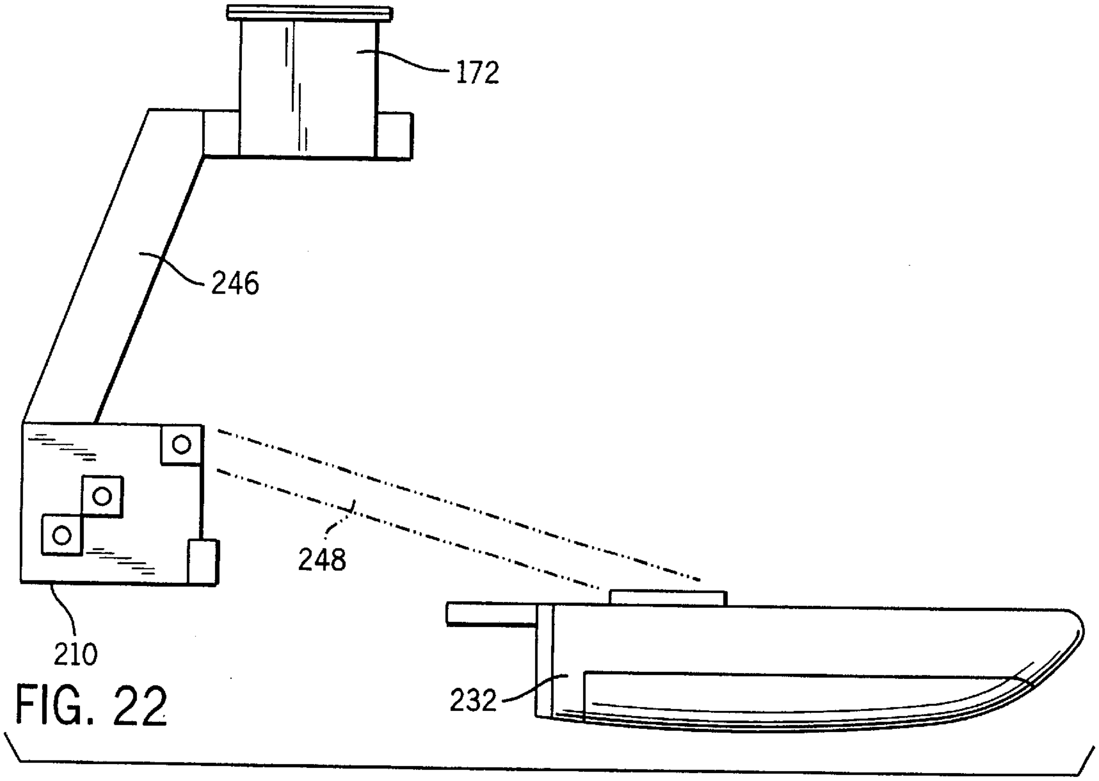
FIG. 22 is a schematic depiction of the mounting bracket similar to that illustrated in FIG. 21, but from the top.

Referring finally to FIGS. 21 and 22, a sheet metal mounting support bracket 246 is schematically illustrated as extending between the outside door lock and door handle interface member 172 and the electronic door latch 210. The mounting support bracket 246 is used to properly space the outside door lock and door handle interface member 172 and the electronic door latch 210 apart, and in the preferred embodiment will be different for each different vehicle door configuration. Accordingly, the mounting support bracket 246 may have a plurality of bends and curves contained therein which are arranged and configured in accordance with the particular vehicle door configuration as well as to accommodate the various components to be assembled into the vehicle door.

In a permutation of the mounting support bracket 246, an additional segment of mounting support bracket 248 may extend between the inside door handle and inside door lock assembly 232 and the electronic door latch 210. The mounting support bracket 248 is used to properly space the inside door handle and inside door lock assembly 232 and the electronic door latch 210 apart, and in the preferred embodiment will again be different for each different vehicle door configuration. In addition, the mounting support bracket 248 may also have a plurality of bends and curves contained therein which are again arranged and configured in accordance with the particular vehicle door configuration as well as to accommodate the various components to be assembled into the vehicle door.

It may therefore be appreciated from the above detailed description of the preferred embodiment of the present invention that it teaches a locking and latching system of modular construction in which the components of the system are preassembled to the greatest extent possible prior to their installation into the structural framework of a vehicle door. The modular construction of the lock and latch system of the present invention includes the outside and inside door handles, the outside and inside locks, the door latch itself, as well as all necessary linkages between these components. The modular components of the present invention further facilitate the assembly process by being of a design which makes the process of installing them into the structural framework of a vehicle door be as simple as is possible, without requiring the use of specialized tools, thereby further reducing the labor costs associated with assembly. The lock and latch system of the present invention substantially enhances the security of the vehicle by providing a lock and latch system which by virtue of its design has an enhanced level of resistance to manipulation by jimmying with a "slim jim" or similar tool of the type commonly used by car thieves.

Advantageously, the lock and latch system of the present invention includes the outside door handle as a separate modular component, thereby allowing outside door handles to be manufactured in a variety of colors to match exterior vehicle paint colors while allowing the other modular components of the system to be of a single type and color. The preassembled nature of the modular components eliminates the requirement for adjustments to be made during the assembly of the components of the lock and latch system into the structural framework of a vehicle door, thereby further minimizing assembly costs while simultaneously enhancing vehicle quality. The modular components of the lock and latch system of the present invention are also adaptable for use on a variety of different vehicles by merely switching outside door handles and providing different size linkages between the various modular components.

The lock and latch system of the present invention is of a construction which is both durable and long lasting, and which will require little or no maintenance to be provided by the user throughout its operating lifetime. The lock and latch system of the present invention is also of inexpensive construction to enhance its market appeal and to thereby afford it the broadest possible market. Finally, all of the aforesaid advantages and objectives of the lock and latch system of the present invention are achieved without incurring any substantial relative disadvantage.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A modular lock and latch system for installation into a door of a vehicle, said modular lock and latch system comprising:

a door latch for mounting on the door of the vehicle so as to releasably engage and retain a striker mounted on a vehicle body when the vehicle door is closed;

an outside door lock and door handle interface member for installation on the door of the vehicle at a position accessible from an opening in the exterior surface of the door of the vehicle;

an outside door lock operatively coupled to said outside door lock and door handle interface member;

an inside door lock and door handle assembly for installation into the door of the vehicle at a position accessible from the interior of the vehicle, said inside door lock and door handle assembly having an inside door lock and an inside door handle;

a plurality of interlinking elements for operatively coupling said outside door lock and door handle interface member and said inside door lock and door handle assembly with said door latch, wherein said door latch, said outside door lock and door handle interface member, said inside door lock and door handle assembly, and said plurality of interlinking elements are preassembled into a first module; and an outside door handle assembly for installation into the opening in the exterior surface of the door of the vehicle, said outside door handle assembly having an outside door handle and a linkage for operatively coupling said outside door handle to said outside door lock and door handle interface member, wherein said outside door handle assembly comprises a second module, wherein said door latch comprises an outside door latch input linkage having first and second positions, an inside door latch input linkage having first and second positions, an outside door lock linkage having lock and unlock positions, and an inside door lock linkage having lock and unlock positions, wherein said door latch releases the striker when said outside door latch input linkage goes from said first position to said second position unless said outside door lock linkage is in said lock position, and wherein said door latch also releases the striker when said inside door latch input linkage goes from said first position to said second position unless said inside door lock linkage is in said lock position.

2. A modular lock and latch system as defined in claim 1, wherein each of said plurality of interlinking elements comprises:

a Bowden cable.

3. A modular lock and latch system as defined in claim 1, wherein said outside door lock is mounted in said outside door lock and door handle interface.

4. A modular lock and latch system as defined in claim 3, wherein said outside door lock and door handle interface comprises:

a housing member having a recess contained therein for receiving said outside door lock therein; and a mounting member for mounting said outside door lock and door handle interface in the opening in the exterior surface of the door of the vehicle.

5. A modular lock and latch system as defined in claim 4, wherein said mounting member has a contoured recess in the side thereof which is configured to precisely fit the opening in the exterior surface of the vehicle door, with the portions of said mounting member which surround said contoured recess on both sides thereof acting to retain said outside door lock and door handle interface member in place in the opening.

6. A modular lock and latch system as defined in claim 5, wherein said outside door lock is accessible through said mounting member, and wherein said outside door handle assembly is arranged and configured to allow access to said outside door lock therethrough.

7. A modular lock and latch system as defined in claim 6, wherein said outside door handle assembly overlies said outside door lock and door handle interface member, said outside door handle assembly having an aperture located therein to allow access to said outside door lock therethrough from outside the vehicle door.

8. A modular lock and latch system as defined in claim 4, wherein said outside door lock comprises:

a pin which extends from an end of said outside door lock installed in said outside door lock and door handle interface, said pin being mounted off-center and rotating when said outside door lock is actuated to lock or unlock said outside door lock; and wherein said outside door lock and door handle interface comprises:

an outside door lock cable actuator located in said recess in said housing member, wherein said pin engages said outside door lock cable actuator when said outside door lock is actuated to lock or unlock said outside door lock, said outside door lock cable actuator being connected to one end of one of said plurality of interlinking elements.

9. A modular lock and latch system as defined in claim 4, wherein said outside door lock and door handle interface additionally comprises:

an outside door handle cable actuator which is pivotally mounted, said outside door handle cable actuator being operatively driven by said linkage for coupling said outside door handle to said outside door lock and door handle interface member, said outside door handle cable actuator being connected to one end of one of said plurality of interlinking elements.

10. A modular lock and latch system as defined in claim 1, wherein said outside door lock comprises:

a cylinder lock.

11. A modular lock and latch system as defined in claim 1, wherein said outside door handle assembly additionally comprises:

an outside door handle housing member, said outside door handle being moveable with respect to said outside door handle housing member between a resting position and an actuated position, said outside door handle housing member being inserted into the opening in the exterior surface of the door of the vehicle; and a lock member mounted on a back side of said outside door handle housing member, said lock member having an initial position permitting insertion of said outside door handle assembly into the opening in the exterior surface of the door of the vehicle, and a retaining position for retaining said outside door handle assembly in the opening in the exterior surface of the door of the vehicle.

12. A modular lock and latch system as defined in claim 11, wherein said lock member is moveable from said initial position to said retaining position by actuating said outside door handle to cause said lock member to move from said resting position to said actuated position, said lock member thereafter remaining in said retaining position irrespective of the position of said outside door handle.

13. A modular lock and latch system for installation into a door of a vehicle, said modular lock and latch system comprising:

a door latch for mounting on the door of the vehicle so as to releasably engage and retain a striker mounted on a vehicle body when the vehicle door is closed, said door latch having an outside door latch input linkage having first and second positions, an inside door latch input linkage having first and second positions, an outside door lock linkage having locked and unlocked positions, and an inside door lock linkage having locked and unlocked positions, said door latch releasing the striker when said outside door latch input linkage goes from said first position to said second position unless said outside door lock linkage is in said locked position, said door latch also releasing the striker when said inside door latch input linkage goes from said first position to said second position unless said inside door lock linkage is in said locked position;

an outside door lock having an outside door lock mechanical output;

an outside door handle assembly for installation into the opening in the exterior surface of the door of the vehicle, said outside door handle assembly having an outside door latch mechanical output;

an outside door lock and door handle interface member for installation into the door of the vehicle, said outside door lock being mounted in said outside door lock and door handle interface member, said outside door lock and door handle interface member receiving said outside door lock mechanical output and providing a corresponding translated outside door lock mechanical output, said outside door lock and door handle interface member also receiving said outside door latch mechanical output and providing a corresponding translated outside door latch mechanical output;

an inside door lock and door handle assembly for installation into the door of the vehicle at a position accessible from the interior of the vehicle, said inside door lock and door handle assembly having an inside door lock mechanical output and an inside door latch mechanical output;

an outside door lock cable for providing said translated outside door lock mechanical output to said outside door lock linkage, said outside door lock thereby being operable to drive said outside door lock linkage between said locked and unlocked positions;

an outside door latch cable for providing said translated outside door latch mechanical output to said outside door latch input linkage, said outside door handle assembly thereby being operable to drive said outside door latch input linkage between said first and second positions;

an inside door lock cable for providing said inside door lock mechanical output to said inside door lock linkage, said inside door lock thereby being operable to drive said inside door lock linkage between said locked and unlocked positions; and an inside door latch cable for providing said inside door latch mechanical output to said inside door latch input linkage, said inside door handle assembly thereby being operable to drive said inside door latch input linkage between said first and second positions.

14. A modular lock and latch system for installation into a door of a vehicle, said modular lock and latch system comprising:

a door latch for mounting on the door of the vehicle so as to releasably engage and retain a striker mounted on a vehicle body when the vehicle door is closed;

an outside door lock and door handle interface member for installation on the door of the vehicle at a position accessible from an opening in the exterior surface of the door of the vehicle;

an outside door lock operatively coupled to said outside door lock and door handle interface member;

an inside door lock and door handle assembly for installation into the door of the vehicle at a position accessible from the interior of the vehicle, said inside door lock and door handle assembly having an inside door lock and an inside door handle;

a plurality of interlinking elements for operatively coupling said outside door lock and door handle interface member and said inside door lock and door handle assembly with said door latch, wherein said door latch, said outside door lock and door handle interface member, said inside door lock and door handle assembly, and said plurality of interlinking elements are preassembled into a first module; and an outside door handle assembly for installation into the opening in the exterior surface of the door of the vehicle, said outside door handle assembly having an outside door handle and a linkage for operatively coupling said outside door handle to said outside door lock and door handle interface member, wherein said outside door handle assembly comprises a second module, wherein said door latch comprises a first control element for releasing said door latch from the striker, said first control element being actuated to release said door latch from the striker by said outside door handle, a second control element for releasing said door latch from the striker, said second control element actuated to release said door latch from the striker by said inside door handle, and a lock element for preventing said first control element from releasing said door latch from the striker, said lock element being actuated by said outside door lock or said inside door lock to prevent said second control element from releasing said door latch from the striker, and wherein said plurality of interlinking elements comprises an outside door release cable operatively connected between said outside door lock and door handle interface member and said first control element, an inside door release cable operatively connected between said inside door handle and said second control element, an outside door lock cable operatively connected between said outside door lock and door handle interface member and said lock element, and an inside door lock cable operatively connected between said inside door lock and said lock element.

15. A modular lock and latch system as defined in claim 14, wherein said door latch additionally comprises:

an electrically operated controller capable of actuating said lock element to prevent said second control element from releasing said door latch from the striker.

16. A modular lock and latch system for installation into a door of a vehicle, said modular lock and latch system comprising:

a door latch for mounting on the door of the vehicle so as to releasably engage and retain a striker mounted on a vehicle body when the vehicle door is closed;

an outside door lock and door handle interface member for installation on the door of the vehicle at a position accessible from an opening in the exterior surface of the door of the vehicle;

an outside door lock operatively coupled to said outside door lock and door handle interface member;

an inside door lock and door handle assembly for installation into the door of the vehicle at a position accessible from the interior of the vehicle, said inside door lock and door handle assembly having an inside door lock and an inside door handle;

a plurality of interlinking elements for operatively coupling said outside door lock and door handle interface member and said inside door lock and door handle assembly with said door latch, wherein said door latch, said outside door lock and door handle interface member, said inside door lock and door handle assembly, and said plurality of interlinking elements are preassembled into a first module; and an outside door handle assembly for installation into the opening in the exterior surface of the door of the vehicle, said outside door handle assembly having an outside door handle and a linkage for operatively coupling said outside door handle to said outside door lock and door handle interface member, wherein said outside door handle assembly comprises a second module, wherein each of said plurality of interlinking elements comprises a Bowden cable.

17. A modular lock and latch system for installation into a door of a vehicle, said modular lock and latch system comprising:

a door latch for mounting on the door of the vehicle so as to releasably engage and retain a striker mounted on a vehicle body when the vehicle door is closed;

an outside door lock and door handle interface member for installation on the door of the vehicle at a position accessible from an opening in the exterior surface of the door of the vehicle;

an outside door lock operatively coupled to said outside door lock and door handle interface member;

an inside door lock and door handle assembly for installation into the door of the vehicle at a position accessible from the interior of the vehicle, said inside door lock and door handle assembly having an inside door lock and an inside door handle;

a plurality of interlinking elements for operatively coupling said outside door lock and door handle interface member and said inside door lock and door handle assembly with said door latch, wherein said door latch, said outside door lock and door handle interface member, said inside door lock and door handle assembly, and said plurality of interlinking elements are preassembled into a first module; and an outside door handle assembly for installation into the opening in the exterior surface of the door of the vehicle, said outside door handle assembly having an outside door handle and a linkage for operatively coupling said outside door handle to said outside door lock and door handle interface member, wherein said outside door handle assembly comprises a second module, wherein said outside door lock is mounted in said outside door lock and door handle interface, wherein said outside door lock and door handle interface comprises a housing member, having a recess contained therein for receiving said outside door lock therein, and a mounting member for mounting said outside door lock and door handle interface in the opening in the exterior surface of the door of the vehicle, wherein said mounting member has a contoured recess in the side thereof which is configured to precisely fit the opening in the exterior surface of the vehicle door, with the portions of said mounting member which surround said contoured recess on both sides thereof acting to retain said outside door lock and door handle interface member in place in the opening.

18. A modular lock and latch system as defined in claim 17, wherein said outside door lock is accessible through said mounting member, and wherein said outside door handle assembly is arranged and configured to allow access to said outside door lock therethrough.

* * * * *